(12) United States Patent
Li et al.

(10) Patent No.: US 11,177,924 B2
(45) Date of Patent: *Nov. 16, 2021

(54) METHOD AND APPARATUS FOR INDICATING CHANNEL IN WIRELESS LOCAL AREA NETWORK

(71) Applicant: HUAWEI TECHNOLOGIES CO., LTD., Shenzhen (CN)

(72) Inventors: Yunbo Li, Shenzhen (CN); Yanchun Li, Boulogne Billancourt (FR); Le Liu, Shenzhen (CN); Jiayin Zhang, Shanghai (CN); Ming Gan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/897,002

(22) Filed: Jun. 9, 2020

(65) Prior Publication Data

US 2020/0304268 A1 Sep. 24, 2020

Related U.S. Application Data

(63) Continuation of application No. 16/055,850, filed on Aug. 6, 2018, now Pat. No. 10,708,029, which is a (Continued)

(30) Foreign Application Priority Data

Feb. 6, 2016 (CN) .......................... 201610084191.3
Mar. 7, 2016 (CN) .......................... 201610128055.X
May 24, 2016 (CN) .......................... 201610353330.8

(51) Int. Cl.
 *H04L 5/00* (2006.01)
 *H04L 27/26* (2006.01)
 (Continued)

(52) U.S. Cl.
 CPC .......... *H04L 5/0053* (2013.01); *H04L 5/0094* (2013.01); *H04L 27/2602* (2013.01);
 (Continued)

(58) Field of Classification Search
 CPC ..................................................... H04L 5/0053
 See application file for complete search history.

(56) References Cited

U.S. PATENT DOCUMENTS

2012/0327915 A1 12/2012 Kang et al.
2013/0176980 A1 7/2013 Kneckt et al.
(Continued)

FOREIGN PATENT DOCUMENTS

CN 103098514 A 5/2013
CN 104584576 A 4/2015
(Continued)

OTHER PUBLICATIONS

U.S. Appl. No. 16/055,850, filed Aug. 6, 2018.
(Continued)

*Primary Examiner* — Kodzovi Acolatse
*Assistant Examiner* — Abdeltif Ajid
(74) *Attorney, Agent, or Firm* — Leydig, Voit & Mayer, Ltd.

(57) ABSTRACT

The present invention discloses a method and an apparatus for indicating a channel in a wireless local area network WLAN. A sending station generates and sends a physical protocol data unit PPDU, the PPDU includes a preamble field and a data field, a high efficiency signal field HE-SIG-A of the preamble field includes a bandwidth identifier and a channel bonding identifier, and the channel bonding identifier is used to indicate whether a data transmission channel is continuous in a frequency domain. In the foregoing manner, a discontinuous channel in a frequency domain in a wireless local area network is indicated, an available channel (Continued)

for data transmission is improved, and a system throughput is increased.

10 Claims, 21 Drawing Sheets

Related U.S. Application Data continuation of application No. PCT/CN2016/111325, filed on Dec. 21, 2016.

(51) Int. Cl.
| | | |
|---|---|---|
| H04W 24/02 | (2009.01) | |
| H04W 72/04 | (2009.01) | |
| H04W 84/12 | (2009.01) | |
| H04W 48/12 | (2009.01) | |
| H04B 7/0452 | (2017.01) | |

(52) U.S. Cl.
CPC ....... *H04W 24/02* (2013.01); *H04W 72/0446* (2013.01); *H04B 7/0452* (2013.01); *H04L 5/0037* (2013.01); *H04L 5/0064* (2013.01); *H04W 48/12* (2013.01); *H04W 84/12* (2013.01)

(56) References Cited

U.S. PATENT DOCUMENTS

| | | | |
|---|---|---|---|
| 2014/0045514 A1 | 2/2014 | Lee et al. | |
| 2015/0373587 A1 | 12/2015 | Josiam et al. | |
| 2016/0021568 A1 | 1/2016 | Yu et al. | |
| 2016/0119174 A1 | 4/2016 | Chavali et al. | |
| 2016/0301451 A1 | 10/2016 | Seok | |
| 2016/0316473 A1* | 10/2016 | Wang | H04W 74/0816 |
| 2017/0366329 A1* | 12/2017 | Cao | H04W 84/18 |
| 2018/0302858 A1 | 10/2018 | Son et al. | |
| 2018/0375632 A1* | 12/2018 | Kim | H04B 7/0452 |

FOREIGN PATENT DOCUMENTS

| | | |
|---|---|---|
| EP | 3082283 A1 | 10/2016 |
| EP | 3396925 A2 | 10/2018 |
| JP | 2015524638 A | 8/2015 |
| JP | 2019503151 A | 1/2019 |
| RU | 2349052 C2 | 3/2009 |
| WO | 2006132467 A1 | 12/2006 |
| WO | 2011108832 A2 | 9/2011 |
| WO | 2014193547 A1 | 12/2014 |
| WO | 2015088116 A1 | 6/2015 |
| WO | 2016170505 A1 | 10/2016 |

OTHER PUBLICATIONS

"Supplement to IEEE Standard for information technology—Telecommunications and information exchange between systems—local and metropolitan area networks—specific requirements; Part 11: Wireless LAN Medium Access Control (MAC) and Physical layer (PHY) specifications, High-speed Physical Layer in the 5GHz Band," IEEE Std 802.11a-1999(R2003), pp. i-83, Institute of Electrical and Electronics Engineers, New York, New York (1999).

"IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," IEEE Std 802.11ac™ -2013, pp. i-395, Institute of Electrical and Electronics Engineers, New York, New York (2013).

"IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 5 : Enhancements for Higher Throughput," IEEE Std 802.11n™ -2009, pp. i-502, Institute of Electrical and Electronics Engineers, New York, New York (Oct. 2009).

Son et al., "Flexible Wider Bandwidth Transmission," IEEE 802.11ax, Institute of Electrical and Electronics Engineers, New York, New York (Jan. 19, 2016).

Li et al., "Non-contiguous Channel Bonding in 11ax," IEEE 802.11-ax, Institute of Electrical and Electronics Engineers, New York, New York (Jan. 20, 2016).

* cited by examiner

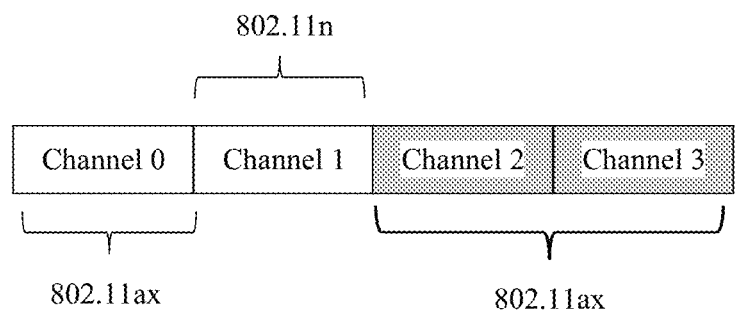
FIG. 1
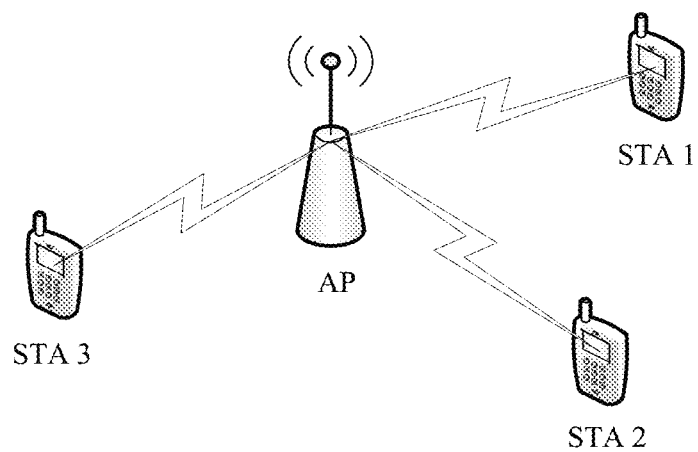
FIG. 2
| 0 | 1 | 2 | 3 | 4 | 5 | 6 | 7 |
|---|---|---|---|---|---|---|---|
| Primary 20 MHz | Secondary 20 MHz | Secondary 40 MHz | | Secondary 80 MHz | | | |
FIG. 3a

| | | | | | | | |
|---|---|---|---|---|---|---|---|
| A primary 20 MHz channel is on the first channel from the left | 0 | 1 | 2 | 3 | 4 | 5 | 6 | 7 |
| A primary 20 MHz channel is on the second channel from the left | 1 | 0 | 2 | 3 | 4 | 5 | 6 | 7 |
| A primary 20 MHz channel is on the third channel from the left | 2 | 3 | 0 | 1 | 4 | 5 | 6 | 7 |
| A primary 20 MHz channel is on the fourth channel from the left | 2 | 3 | 1 | 0 | 4 | 5 | 6 | 7 |
| A primary 20 MHz channel is on the fifth channel from the left | 4 | 5 | 6 | 7 | 0 | 1 | 2 | 3 |
| A primary 20 MHz channel is on the sixth channel from the left | 4 | 5 | 6 | 7 | 1 | 0 | 2 | 3 |
| A primary 20 MHz channel is on the seventh channel from the left | 4 | 5 | 6 | 7 | 2 | 3 | 0 | 1 |
| A primary 20 MHz channel is on the eighth channel from the left | 4 | 5 | 6 | 7 | 2 | 3 | 1 | 0 |

FIG. 3b

| A1 242 | RU allocation signaling of A1-242, C1-242, A2-242, and C2-242 | User specific fields of A1-242, C1-242, A2-242, and C2-242 | HE-SIG-B 1 |
|---|---|---|---|
| B1 242 | RU allocation signaling of B1-242, D1-242, B2-242, and D2-242 | User specific fields of B1-242, D1-242, B2-242, and D2-242 | HE-SIG-B 2 |
| C1 242 | RU allocation signaling of A1-242, C1-242, A2-242, and C2-242 | User specific fields of A1-242, C1-242, A2-242, and C2-242 | HE-SIG-B 1 |
| D1 242 | RU allocation signaling of B1-242, D1-242, B2-242, and D2-242 | User specific fields of B1-242, D1-242, B2-242, and D2-242 | HE-SIG-B 2 |
| A2 242 | RU allocation signaling of A1-242, C1-242, A2-242, and C2-242 | User specific fields of A1-242, C1-242, A2-242, and C2-242 | HE-SIG-B 1 |
| B2 242 | RU allocation signaling of B1-242, D1-242, B2-242, and D2-242 | User specific fields of B1-242, D1-242, B2-242, and D2-242 | HE-SIG-B 2 |
| C2 242 | RU allocation signaling of A1-242, C1-242, A2-242, and C2-242 | User specific fields of A1-242, C1-242, A2-242, and C2-242 | HE-SIG-B 1 |
| D2 242 | RU allocation signaling of B1-242, D1-242, B2-242, and D2-242 | User specific fields of B1-242, D1-242, B2-242, and D2-242 | HE-SIG-B 2 |

FIG. 9

| Channel bonding (CB) | Bandwidth (BW) | Channel | | | | | | | |
|---|---|---|---|---|---|---|---|---|---|
| | | 0 | 1 | 2 | 3 | 4 | 5 | 6 | 7 |
| 0 | 00 | ■ | | | | | | | |
| 0 | 01 | ■ | ■ | | | | | | |
| 0 | 10 | ■ | ■ | ■ | ■ | | | | |
| 0 | 11 | ■ | ■ | ■ | ■ | ■ | ■ | ■ | ■ |
| 1 | 00 | ■ | | | | ■ | ■ | ■ | ■ |
| 1 | 01 | ■ | | ■ | | ■ | ■ | ■ | ■ |
| 1 | 10 | ■ | | ■ | ■ | ■ | ■ | ■ | ■ |
| 1 | 11 | ■ | | ■ | | ■ | ■ | ■ | ■ |

| Bandwidth (BW) | Channel bonding (CB) | Channel | | | | | | | |
|---|---|---|---|---|---|---|---|---|---|
| | | 0 | 1 | 2 | 3 | 4 | 5 | 6 | 7 |
| 00 | 0 or 1 or reserved | | | | | | | | |
| 01 | 0 or 1 or reserved | | | | | | | | |
| 10 | 0 | | | | | | | | |
| 10 | 1 | | | | | | | | |
| 11 | 0 | | | | | | | | |
| 11 | 1 | | | | | | | | |

FIG. 12

| Bandwidth (BW) | Channel bonding (CB) | Channel | | | | | | | |
|---|---|---|---|---|---|---|---|---|---|
| | | 0 | 1 | 2 | 3 | 4 | 5 | 6 | 7 |
| 00 | 0 or 1 or reserved | ▓ | | | | | | | |
| 01 | 0 or 1 or reserved | ▓ | ▓ | | | | | | |
| 10 | 0 | ▓ | ▓ | ▓ | ▓ | | | | |
| 10 | 1 | ▓ | | ▓ | ▓ | | | | |
| 11 | 0 | ▓ | ▓ | ▓ | ▓ | ▓ | ▓ | ▓ | ▓ |
| 11 | 1 | ▓ | | | | ▓ | ▓ | ▓ | ▓ |

FIG. 13

| Bandwidth (BW) | Channel bonding (CB) | Channel | | | | | | | |
|---|---|---|---|---|---|---|---|---|---|
| | | 0 | 1 | 2 | 3 | 4 | 5 | 6 | 7 |
| 00 | 0 or 1 or reserved | ▓ | | | | | | | |
| 01 | 0 or 1 or reserved | ▓ | ▓ | | | | | | |
| 10 | 0 | ▓ | ▓ | ▓ | ▓ | | | | |
| 10 | 1 | ▓ | | ▓ | ▓ | | | | |
| 11 | 0 | ▓ | ▓ | ▓ | ▓ | ▓ | ▓ | ▓ | ▓ |
| 11 | 1 | ▓ | | ▓ | ▓ | ▓ | ▓ | ▓ | ▓ |

FIG. 14

| Bandwidth (BW) | Channel bonding (CB) | Channel | | | | | | | |
|---|---|---|---|---|---|---|---|---|---|
| | | 0 | 1 | 2 | 3 | 4 | 5 | 6 | 7 |
| 00 | 0 or 1 or reserved | ▓ | | | | | | | |
| 01 | 0 or 1 or reserved | ▓ | ▓ | | | | | | |
| 10 | 0 | ▓ | ▓ | ▓ | ▓ | | | | |
| 10 | 1 | ▓ | | ▓ | ▓ | | | | |
| 11 | 0 or 1 or reserved | ▓ | ▓ | ▓ | ▓ | ▓ | ▓ | ▓ | ▓ |

FIG. 15

| Bandwidth (BW) | Channel bonding (CB) | Channel | | | | | | | |
|---|---|---|---|---|---|---|---|---|---|
| | | 0 | 1 | 2 | 3 | 4 | 5 | 6 | 7 |
| 00 | 0 or 1 or reserved | ▓ | | | | | | | |
| 01 | 0 or 1 or reserved | ▓ | ▓ | | | | | | |
| 10 | 0 or 1 or reserved | ▓ | ▓ | ▓ | ▓ | | | | |
| 11 | 0 | ▓ | ▓ | ▓ | ▓ | ▓ | ▓ | ▓ | ▓ |
| 11 | 1 | ▓ | ▓ | ▓ | ▓ | ▓ | ▓ | ▓ | ▓ |

FIG. 16

| BW | CB  | 0              | 1              | 2              | 3              | 4              | 5              | 6              | 7              |
|----|-----|----------------|----------------|----------------|----------------|----------------|----------------|----------------|----------------|
| 0  | 0/1 | HE-SIG-B1      |                |                |                |                |                |                |                |
| 1  | 1/0 | HE-SIG-B1      | HE-SIG-B2      |                |                |                |                |                |                |
| 2  | 0   | HE-SIG-B1      |                | HE-SIG-B1      | HE-SIG-B2      |                |                |                |                |
| 2  | 1   | HE-SIG-B1      | HE-SIG-B2      | HE-SIG-B1      | HE-SIG-B2      |                |                |                |                |
| 3  | 0   | HE-SIG-B1      |                |                |                | HE-SIG-B1      | HE-SIG-B2      | HE-SIG-B1      | HE-SIG-B2      |
| 3  | 1   | HE-SIG-B1      | HE-SIG-B2      |                |                | HE-SIG-B1      | HE-SIG-B2      | HE-SIG-B1      | HE-SIG-B2      |

FIG. 17a

| BW | CB | 1 | 0 | 2 | 3 | | 4 | 5 | 6 | 7 |
|---|---|---|---|---|---|---|---|---|---|---|
| 0 | 0/1 | | HE-SIG-B2 | | | | | | | |
| 1 | 1/0 | HE-SIG-B1 | HE-SIG-B2 | | | | | | | |
| 2 | 0 | | HE-SIG-B2 | HE-SIG-B1 | HE-SIG-B2 | | | | | |
| 2 | 1 | HE-SIG-B1 | HE-SIG-B2 | HE-SIG-B1 | HE-SIG-B2 | | | | | |
| 3 | 0 | | HE-SIG-B2 | | | | HE-SIG-B1 | HE-SIG-B2 | HE-SIG-B1 | HE-SIG-B2 |
| 3 | 1 | HE-SIG-B1 | HE-SIG-B2 | | | | HE-SIG-B1 | HE-SIG-B2 | HE-SIG-B1 | HE-SIG-B2 |

FIG. 17b

| Bandwidth (BW) | Channel bonding (CB) | Channel | | | | | | | |
|---|---|---|---|---|---|---|---|---|---|
| | | 0 | 1 | 2 | 3 | 4 | 5 | 6 | 7 |
| 00 | 0 or 1 or reserved | | | | | | | | |
| 01 | 0 or 1 or reserved | | | | | | | | |
| 10 | 0 | | | | | | | | |
| 10 | 1 | | | | | | | | |
| 11 | 0 | | | | | | | | |
| 11 | 1 | | | | | | | | |

FIG. 18a

| Bandwidth (BW) | Channel bonding (CB) | Channel | | | | | | | |
|---|---|---|---|---|---|---|---|---|---|
| | | 0 | 1 | 2 | 3 | 4 | 5 | 6 | 7 |
| 00 | 0 or 1 or reserved | | | | | | | | |
| 01 | 0 or 1 or reserved | | | | | | | | |
| 10 | 0 | | | | | | | | |
| 10 | 1 | | | | | | | | |
| 11 | 0 | | | | | | | | |
| 11 | 1 | | | | | | | | |

FIG. 18b

| Bandwidth (BW) | Channel bonding (CB) | Channel | | | | | | | |
|---|---|---|---|---|---|---|---|---|---|
| | | 0 | 1 | 2 | 3 | 4 | 5 | 6 | 7 |
| 00 | 0 | | | | | | | | |
| 01 | 0 or 1 or reserved | | | | | | | | |
| 10 | 0 | | | | | | | | |
| 10 | 1 | | | | | | | | |
| 11 | 0 | | | | | | | | |
| 11 | 1 | | | | | | | | |
| 00 | 1 | | | | | | | | |

FIG. 18c

| Bandwidth (BW) | Channel bonding (CB) | Channel | | | | | | | |
|---|---|---|---|---|---|---|---|---|---|
| | | 0 | 1 | 2 | 3 | 4 | 5 | 6 | 7 |
| 00 | 0 | | | | | | | | |
| 01 | 1 | | | | | | | | |
| 10 | 0 | | | | | | | | |
| 10 | 1 | | | | | | | | |
| 11 | 0 | | | | | | | | |
| 11 | 1 | | | | | | | | |
| 00 | 1 | | | | | | | | |
| 01 | 0 | | | | | | | | |

FIG. 18d

| Bandwidth (BW) | Channel bonding (CB) |
|---|---|
| 0 | 0 or 1 or reserved |
| 1 | 0 or 1 or reserved |
| 10 | 0 |
| 10 | 1 |
| 11 | 0 |
| 11 | 1 |

FIG. 19

| Bandwidth (BW) | Channel bonding (CB) |
|---|---|
| 00 | 0 or 1 or reserved |
| 01 | 0 or 1 or reserved |
| 10 | 0 |
| 10 | 1 |
| 11 | 0 |
| 11 | 1 |

FIG. 20a

| Bandwidth (BW) | Channel bonding (CB) | Channel | | | | | | | |
|---|---|---|---|---|---|---|---|---|---|
| | | 0 | 1 | 2 | 3 | 4 | 5 | 6 | 7 |
| 0 | 0 | | | | | | | | |
| 1 | 1 | | | | | | | | |
| 10 | 0 | | | | | | | | |
| 10 | 1 | | | | | | | | |
| 11 | 0 | | | | | | | | |
| 11 | 1 | | | | | | | | |

FIG. 20b

| Bandwidth (BW) | Channel bonding (CB) | Channel | | | | | | | |
|---|---|---|---|---|---|---|---|---|---|
| | | 0 | 1 | 2 | 3 | 4 | 5 | 6 | 7 |
| 00 | 0 | | | | | | | | |
| 01 | 1 | | | | | | | | |
| 10 | 0 | | | | | | | | |
| 10 | 1 | | | | | | | | |
| 11 | 0 | | | | | | | | |
| 11 | 1 | | | | | | | | |
| 00 | 1 | | | | | | | | |

FIG. 20c

| Bandwidth (BW) | Channel bonding (CB) | Channel | | | | | | | |
|---|---|---|---|---|---|---|---|---|---|
| | | 0 | 1 | 2 | 3 | 4 | 5 | 6 | 7 |
| 00 | 0 | | | | | | | | |
| 01 | 1 | | | | | | | | |
| 10 | 0 | | | | | | | | |
| 10 | 1 | | | | | | | | |
| 11 | 0 | | | | | | | | |
| 11 | 1 | | | | | | | | |
| 00 | 1 | | | | | | | | |
| 01 | 0 | | | | | | | | |

FIG. 20d

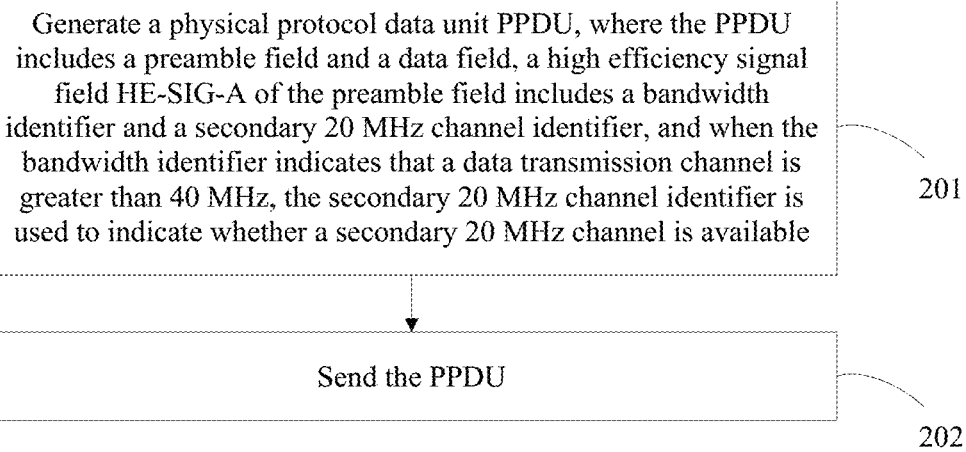

Generate a physical protocol data unit PPDU, where the PPDU includes a preamble field and a data field, a high efficiency signal field HE-SIG-A of the preamble field includes a bandwidth identifier and a secondary 20 MHz channel identifier, and when the bandwidth identifier indicates that a data transmission channel is greater than 40 MHz, the secondary 20 MHz channel identifier is used to indicate whether a secondary 20 MHz channel is available ~ 201

Send the PPDU ~ 202

FIG. 21

| Bandwidth (BW) | Secondary 20 MHz channel is available | Channel | | | | | | | |
|---|---|---|---|---|---|---|---|---|---|
| | | 0 | 1 | 2 | 3 | 4 | 5 | 6 | 7 |
| 00 | 0 or reserved | | | | | | | | |
| 01 | 1 or reserved | | | | | | | | |
| 10 | 0 | | | | | | | | |
| 10 | 1 | | | | | | | | |
| 11 | 0 | | | | | | | | |
| 11 | 1 | | | | | | | | |

FIG. 22

| BW | 0 | 1 | 2 | 3 | 4 | 5 | 6 | 7 |
|---|---|---|---|---|---|---|---|---|
| 00 | | | | | | | | |
| 01 | | | | | | | | |
| 10 | | | | | | | | |
| 11 | | | | | | | | |

FIG. 23

| Mode | Channel | | | | | | | |
|---|---|---|---|---|---|---|---|---|
| | 0 | 1 | 2 | 3 | 4 | 5 | 6 | 7 |
| 1 | X | | | | | | | |
| 2 | X | X | | | | | | |
| 3 | X | X | X | X | | | | |
| 4 | X | X | X | X | X | X | X | X |
| 5 | X | | X | X | | | | |
| 6 | | X | X | | | | | |
| 7 | X | X | | | X | X | X | X |
| 8 | X | | X | X | X | X | X | X |

FIG. 26

| Mode | Channel | | | | | | | |
|---|---|---|---|---|---|---|---|---|
| | 0 | 1 | 2 | 3 | 4 | 5 | 6 | 7 |
| 1 | X | | | | | | | |
| 2 | X | X | | | | | | |
| 3 | X | X | X | X | | | | |
| 4 | X | X | X | X | X | X | X | X |
| 5 | X | | X | X | | | | |
| 6 | X | X | X | | | | | |
| 7 | X | X | | | X | X | X | X |
| 8 | X | | X | X | X | X | X | X |

FIG. 27

METHOD AND APPARATUS FOR INDICATING CHANNEL IN WIRELESS LOCAL AREA NETWORK

CROSS-REFERENCE TO RELATED APPLICATIONS

This application is a continuation of U.S. patent application Ser. No. 16/055,850, filed Aug. 6, 2018, which is a continuation of International Application No. PCT/CN2016/111325, filed on Dec. 21, 2016, which claims priority to Chinese Patent Application No. 201610084191.3, filed on Feb. 6, 2016 and Chinese Patent Application No. 201610128055.X, filed on Mar. 7, 2016, and Chinese Patent Application No. 201610353330.8, filed on May 24, 2016. All of which are hereby incorporated by reference in their entireties.

TECHNICAL FIELD

Embodiments of the present invention relate to the field of communications technologies, and in particular, to a method and an apparatus for indicating a channel in a wireless local area network.

BACKGROUND

As wireless local area network (WLAN) standards evolve, a WLAN system obtains a higher transmission rate by using higher bandwidth. In the standards, 20 MHz is usually used as a basic bandwidth unit. A bandwidth of 20 MHz is used in the 802.11a. The bandwidth is increased to 40 MHz in the 802.11n, and is increased to 80 MHz and 160 MHz in the 802.11ac. When the bandwidth is greater than 20 MHz, one 20 MHz channel is a primary 20 MHz channel, and a remaining 20 MHz channel is a secondary channel. In the current standards, when a station accesses a channel, a primary 20 MHz channel needs to be included. That is, when the primary 20 MHz channel is occupied, even if another channel is idle, the channel cannot be used. A channel bandwidth defined in the current standards has four modes: 20 MHz, 40 MHz, 80 MHz, and 160 (80+80) MHz.

In the next-generation WLAN standard 802.11ax, an intensive deployment scenario is mainly studied, and a study emphasis is turned from a peak throughput increment to spectral efficiency improvement. For a scenario in which stations supporting different WLAN standards intensively coexist, for example, for a scenario in which a station supporting 802.11n and a station supporting 802.11ax are intensively deployed, as shown in FIG. 1, each channel in FIG. 1 has a bandwidth of 20 MHz, an 802.11n station performs transmission by using a bandwidth of 20 MHz, and a spectrum is cut during narrowband transmission performed by the 802.11n station, causing channels available to an 802.11ax station to be discontinuous.

However, existing WLAN standards are short of an indication of a discontinuous channel in a frequency domain.

SUMMARY

In view of this, embodiments of the present invention provide a method and an apparatus for indicating a channel in a wireless local area network, so as indicate a discontinuous channel in a frequency domain.

According to one aspect, the present invention provides a method for indicating a channel in a wireless local area network WLAN. The method for indicating a channel is applied to a downlink between an access point and a station. The method for indicating a channel is performed by the access point, and is applied to a downlink multiuser transmission scenario between the access point and multiple stations. In the method for indicating a channel, a physical protocol data unit PPDU is first generated. The PPDU includes a preamble field and a data field, a high efficiency signal field HE-SIG-A of the preamble field includes a bandwidth identifier and a channel bonding identifier, and the channel bonding identifier is used to indicate whether a data transmission channel is continuous in a frequency domain. Then, the PPDU is sent.

Specifically, if the channel bonding identifier is a first value, the data transmission channel is continuous in the frequency domain; or if the channel bonding identifier is a second value, the data transmission channel includes multiple discontinuous channels in the frequency domain.

In a possible implementation, if the channel bonding identifier is the first value, and the bandwidth identifier is a first value, the data transmission channel includes a primary 20 MHz channel; if the channel bonding identifier is the first value, and the bandwidth identifier is a second value, the data transmission channel includes a primary 20 MHz channel and a secondary 20 MHz channel; if the channel bonding identifier is the first value, and the bandwidth identifier is a third value, the data transmission channel includes a primary 20 MHz channel, a secondary 20 MHz channel, and a secondary 40 MHz channel; if the channel bonding identifier is the first value, and the bandwidth identifier is a fourth value, the data transmission channel includes a primary 20 MHz channel, a secondary 20 MHz channel, a secondary 40 MHz channel, and a secondary 80 MHz channel; if the channel bonding identifier is the second value, and the bandwidth identifier is a first value, the data transmission channel includes primary 20 MHz and a secondary 40 MHz channel; if the channel bonding identifier is the second value, and the bandwidth identifier is a second value, the data transmission channel includes a primary 20 MHz channel and a secondary 80 MHz channel; if the channel bonding identifier is the second value, and the bandwidth identifier is a third value, the data transmission channel includes a primary 20 MHz channel, a secondary 20 MHz channel, and a secondary 80 MHz channel; or if the channel bonding identifier is the second value, and the bandwidth identifier is a fourth value, the data transmission channel includes a primary 20 MHz channel, a secondary 40 MHz channel, and a secondary 80 MHz channel.

In a possible implementation, if the bandwidth identifier is a first value, the data transmission channel includes a primary 20 MHz channel; if the bandwidth identifier is a second value, the data transmission channel includes a primary 20 MHz channel and a secondary 20 MHz channel; if the bandwidth identifier is a third value, and the channel bonding identifier is the first value, the data transmission channel includes a primary 20 MHz channel, a secondary 20 MHz channel, and a secondary 40 MHz channel; if the bandwidth identifier is a third value, and the channel bonding identifier is the second value, the data transmission channel includes a primary 20 MHz channel and a secondary 40 MHz channel; if the bandwidth identifier is a fourth value, and the channel bonding identifier is the first value, the data transmission channel includes a primary 20 MHz channel, a secondary 20 MHz channel, a secondary 40 MHz channel, and a secondary 80 MHz channel; or if the bandwidth identifier is a fourth value, and the channel bonding identifier is the second value, the data transmission channel includes a primary 20 MHz channel, a secondary 40 MHz channel, and a secondary 80 MHz channel.

In a possible implementation, if the bandwidth identifier is a first value, the data transmission channel includes a primary 20 MHz channel; if the bandwidth identifier is a second value, the data transmission channel includes a primary 20 MHz channel and a secondary 20 MHz channel; if the bandwidth identifier is a third value, and the channel bonding identifier is the first value, the data transmission channel includes a primary 20 MHz channel, a secondary 20 MHz channel, and a secondary 40 MHz channel; if the bandwidth identifier is a third value, and the channel bonding identifier is the second value, the data transmission channel includes a primary 20 MHz channel and a secondary 40 MHz channel; if the bandwidth identifier is a fourth value, and the channel bonding identifier is the first value, the data transmission channel includes a primary 20 MHz channel, a secondary 20 MHz channel, a secondary 40 MHz channel, and a secondary 80 MHz channel; or if the bandwidth identifier is a fourth value, and the channel bonding identifier is the second value, the data transmission channel includes a primary 20 MHz channel and a secondary 80 MHz channel.

In a possible implementation, if the bandwidth identifier is a first value, the data transmission channel includes a primary 20 MHz channel; if the bandwidth identifier is a second value, the data transmission channel includes a primary 20 MHz channel and a secondary 20 MHz channel; if the bandwidth identifier is a third value, and the channel bonding identifier is the first value, the data transmission channel includes a primary 20 MHz channel, a secondary 20 MHz channel, and a secondary 40 MHz channel; if the bandwidth identifier is a third value, and the channel bonding identifier is the second value, the data transmission channel includes a primary 20 MHz channel and a secondary 40 MHz channel; if the bandwidth identifier is a fourth value, and the channel bonding identifier is the first value, the data transmission channel includes a primary 20 MHz channel, a secondary 20 MHz channel, a secondary 40 MHz channel, and a secondary 80 MHz channel; or if the bandwidth identifier is a fourth value, and the channel bonding identifier is the second value, the data transmission channel includes a primary 20 MHz channel, a secondary 20 MHz channel, and a secondary 80 MHz channel.

In a possible implementation, if the bandwidth identifier is a first value, the data transmission channel includes a primary 20 MHz channel; if the bandwidth identifier is a second value, the data transmission channel includes a primary 20 MHz channel and a secondary 20 MHz channel; if the bandwidth identifier is a third value, and the channel bonding identifier is the first value, the data transmission channel includes a primary 20 MHz channel, a secondary 20 MHz channel, and a secondary 40 MHz channel; if the bandwidth identifier is a third value, and the channel bonding identifier is the second value, the data transmission channel includes a primary 20 MHz channel and a secondary 40 MHz channel; or if the bandwidth identifier is a fourth value, the data transmission channel includes a primary 20 MHz channel, a secondary 20 MHz channel, a secondary 40 MHz channel, and a secondary 80 MHz channel.

According to another aspect, the present invention provides an apparatus for indicating a channel in a wireless local area network WLAN. The apparatus for indicating a channel is an access point, and is applied to a downlink multiuser transmission scenario between the access point and multiple stations. The apparatus for indicating a channel includes a baseband circuit and a radio frequency circuit. The baseband circuit is configured to generate a physical protocol data unit PPDU. The PPDU includes a preamble field and a data field, a high efficiency signal field HE-SIG-A of the preamble field includes a bandwidth identifier and a channel bonding identifier, and the channel bonding identifier is used to indicate whether a data transmission channel is continuous in a frequency domain. The radio frequency circuit is configured to send the PPDU.

Specifically, if the channel bonding identifier is a first value, the data transmission channel is continuous in the frequency domain; or if the channel bonding identifier is a second value, the data transmission channel includes multiple discontinuous channels in the frequency domain.

In a possible implementation, if the channel bonding identifier is the first value, and the bandwidth identifier is a first value, the data transmission channel includes a primary 20 MHz channel; if the channel bonding identifier is the first value, and the bandwidth identifier is a second value, the data transmission channel includes a primary 20 MHz channel and a secondary 20 MHz channel; if the channel bonding identifier is the first value, and the bandwidth identifier is a third value, the data transmission channel includes a primary 20 MHz channel, a secondary 20 MHz channel, and a secondary 40 MHz channel; if the channel bonding identifier is the first value, and the bandwidth identifier is a fourth value, the data transmission channel includes a primary 20 MHz channel, a secondary 20 MHz channel, a secondary 40 MHz channel, and a secondary 80 MHz channel; if the channel bonding identifier is the second value, and the bandwidth identifier is a first value, the data transmission channel includes primary 20 MHz and a secondary 40 MHz channel; if the channel bonding identifier is the second value, and the bandwidth identifier is a second value, the data transmission channel includes a primary 20 MHz channel and a secondary 80 MHz channel; if the channel bonding identifier is the second value, and the bandwidth identifier is a third value, the data transmission channel includes a primary 20 MHz channel, a secondary 20 MHz channel, and a secondary 80 MHz channel; or if the channel bonding identifier is the second value, and the bandwidth identifier is a fourth value, the data transmission channel includes a primary 20 MHz channel, a secondary 40 MHz channel, and a secondary 80 MHz channel.

In a possible implementation, if the bandwidth identifier is a first value, the data transmission channel includes a primary 20 MHz channel; if the bandwidth identifier is a second value, the data transmission channel includes a primary 20 MHz channel and a secondary 20 MHz channel; if the bandwidth identifier is a third value, and the channel bonding identifier is the first value, the data transmission channel includes a primary 20 MHz channel, a secondary 20 MHz channel, and a secondary 40 MHz channel; if the bandwidth identifier is a third value, and the channel bonding identifier is the second value, the data transmission channel includes a primary 20 MHz channel and a secondary 40 MHz channel; if the bandwidth identifier is a fourth value, and the channel bonding identifier is the first value, the data transmission channel includes a primary 20 MHz channel, a secondary 20 MHz channel, a secondary 40 MHz channel, and a secondary 80 MHz channel; or if the bandwidth identifier is a fourth value, and the channel bonding identifier is the second value, the data transmission channel includes a primary 20 MHz channel, a secondary 40 MHz channel, and a secondary 80 MHz channel.

In a possible implementation, if the bandwidth identifier is a first value, the data transmission channel includes a primary 20 MHz channel; if the bandwidth identifier is a second value, the data transmission channel includes a primary 20 MHz channel and a secondary 20 MHz channel; if the bandwidth identifier is a third value, and the channel bonding identifier is the first value, the data transmission channel includes a primary 20 MHz channel, a secondary 20 MHz channel, and a secondary 40 MHz channel; if the bandwidth identifier is a third value, and the channel bonding identifier is the second value, the data transmission channel includes a primary 20 MHz channel and a secondary 40 MHz channel; if the bandwidth identifier is a fourth value, and the channel bonding identifier is the first value, the data transmission channel includes a primary 20 MHz channel, a secondary 20 MHz channel, a secondary 40 MHz channel, and a secondary 80 MHz channel; or if the bandwidth identifier is a fourth value, and the channel bonding identifier is the second value, the data transmission channel includes a primary 20 MHz channel and a secondary 80 MHz channel.

In a possible implementation, if the bandwidth identifier is a first value, the data transmission channel includes a primary 20 MHz channel; if the bandwidth identifier is a second value, the data transmission channel includes a primary 20 MHz channel and a secondary 20 MHz channel; if the bandwidth identifier is a third value, and the channel bonding identifier is the first value, the data transmission channel includes a primary 20 MHz channel, a secondary 20 MHz channel, and a secondary 40 MHz channel; if the bandwidth identifier is a third value, and the channel bonding identifier is the second value, the data transmission channel includes a primary 20 MHz channel and a secondary 40 MHz channel; if the bandwidth identifier is a fourth value, and the channel bonding identifier is the first value, the data transmission channel includes a primary 20 MHz channel, a secondary 20 MHz channel, a secondary 40 MHz channel, and a secondary 80 MHz channel; or if the bandwidth identifier is a fourth value, and the channel bonding identifier is the second value, the data transmission channel includes a primary 20 MHz channel, a secondary 20 MHz channel, and a secondary 80 MHz channel.

In a possible implementation, if the bandwidth identifier is a first value, the data transmission channel includes a primary 20 MHz channel; if the bandwidth identifier is a second value, the data transmission channel includes a primary 20 MHz channel and a secondary 20 MHz channel; if the bandwidth identifier is a third value, and the channel bonding identifier is the first value, the data transmission channel includes a primary 20 MHz channel, a secondary 20 MHz channel, and a secondary 40 MHz channel; if the bandwidth identifier is a third value, and the channel bonding identifier is the second value, the data transmission channel includes a primary 20 MHz channel and a secondary 40 MHz channel; or if the bandwidth identifier is a fourth value, the data transmission channel includes a primary 20 MHz channel, a secondary 20 MHz channel, a secondary 40 MHz channel, and a secondary 80 MHz channel.

It can be learned from the foregoing solutions that, embodiments of the present invention provide a method and an apparatus for indicating a channel in a wireless local area network WLAN. A sending station generates and sends a physical protocol data unit PPDU, the PPDU includes a preamble field and a data field, a high efficiency signal field HE-SIG-A of the preamble field includes a bandwidth identifier and a channel bonding identifier, and the channel bonding identifier is used to indicate whether a data transmission channel is continuous in a frequency domain. In the foregoing manner, a discontinuous channel in a frequency domain in a wireless local area network is indicated, an available data transmission channel is improved, and a system throughput is increased.

BRIEF DESCRIPTION OF DRAWINGS

FIG. 1 is a channel allocation diagram in which an 802.11n station and an 802.11ax station coexist;

FIG. 2 is an application scenario diagram of a system according to an embodiment of the present invention;

FIG. 3a is a channel allocation diagram of a system according to an embodiment of the present invention;

FIG. 3b is another channel allocation diagram of a system according to an embodiment of the present invention;

FIG. 9 is a diagram of allocating a resource unit of an HE-SIG-B of a physical protocol data unit in a bandwidth of 160 MHz;

FIG. 12 is a channel indication diagram of an implementation 2 according to Embodiment 1 of the present invention;

FIG. 13 is a channel indication diagram of an implementation 3 according to Embodiment 1 of the present invention;

FIG. 14 is a channel indication diagram of an implementation 4 according to Embodiment 1 of the present invention;

FIG. 15 is a channel indication diagram of an implementation 5 according to Embodiment 1 of the present invention;

FIG. 16 is a channel indication diagram of an implementation 6 according to Embodiment 1 of the present invention;

FIG. 17a is a first channel indication diagram of an implementation 7 according to Embodiment 1 of the present invention;

FIG. 17b is a second channel indication diagram of an implementation 7 according to Embodiment 1 of the present invention;

FIG. 18a is a first channel indication diagram of an implementation 8 according to Embodiment 1 of the present invention;

FIG. 18b is a second channel indication diagram of an implementation 8 according to Embodiment 1 of the present invention;

FIG. 18c is a third channel indication diagram of an implementation 8 according to Embodiment 1 of the present invention;

FIG. 18d is a fourth channel indication diagram of an implementation 8 according to Embodiment 1 of the present invention;

FIG. 19 is a channel indication diagram of an implementation 9 according to Embodiment 1 of the present invention;

FIG. 20a is a first channel indication diagram of an implementation 10 according to Embodiment 1 of the present invention;

FIG. 20b is a second channel indication diagram of an implementation 10 according to Embodiment 1 of the present invention;

FIG. 20c is a third channel indication diagram of an implementation 10 according to Embodiment 1 of the present invention;

FIG. 20d is a fourth channel indication diagram of an implementation 10 according to Embodiment 1 of the present invention;

FIG. 21 is a flowchart of a method according to Embodiment 2 of the present invention;

FIG. 22 is a channel indication diagram according to Embodiment 2 of the present invention;

FIG. 23 is a channel indication diagram according to Embodiment 3 of the present invention;

FIG. 26 is a channel indication diagram 1 according to Embodiment 8 of the present invention; and FIG. 27 is a channel indication diagram 2 according to Embodiment 8 of the present invention.

DESCRIPTION OF EMBODIMENTS

Figure 4:
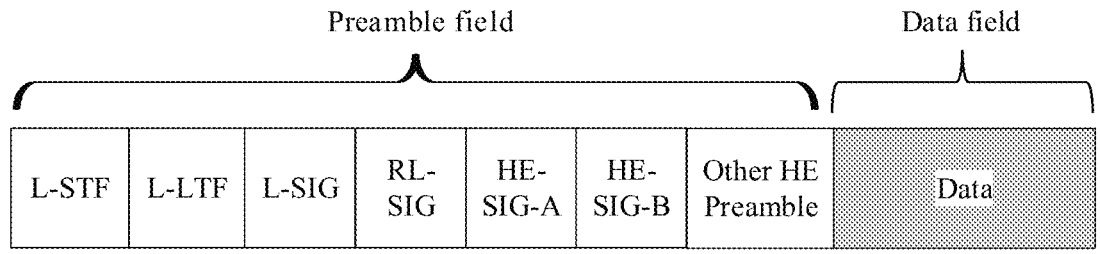
FIG. 4 is a diagram of a frame structure of a physical protocol data unit of a system according to an embodiment of the present invention.

Embodiments of the present invention may be applied to a Wireless Local Area Network (WLAN). The wireless local area network may include multiple basic service sets (BSS). A network node in a basic service set is a station (STA), and the station includes an access point (AP) station and a non-access point station (Non-AP STA). Each basic service set may include one AP and multiple non-AP STAs associated with the AP.

The access point (AP) station is also referred to as a wireless access point, a hotspot, or the like. An AP is an access point at which a mobile user accesses a wired network, and is mainly deployed at home and inside a building and a campus. A typical coverage radius is tens of or hundreds of meters. Certainly, the AP may be deployed outdoors. The AP is equivalent to a bridge connecting a wired network and a wireless network, and is mainly configured to: connect various wireless network clients together, and then connect the wireless network to the Ethernet. Currently, standards mainly used by the AP are the Institute of Electrical and Electronics Engineers (IEEE), 802.11 series. Specifically, the AP may be a terminal device or a network device having a Wireless Fidelity (Wi-Fi)_chip. Optionally, the AP may be a device supporting the 802.11ax standard.

The non-access point (Non-AP STA) station may be a wireless communications chip, a wireless sensor, or a wireless communications terminal, such as a mobile phone supporting a Wi-Fi communications function, a tablet computer supporting a Wi-Fi communications function, a set-top box supporting a Wi-Fi communications function, a smart television supporting a Wi-Fi communications function, a smart wearable device supporting a Wi-Fi communications function, or a computer supporting a Wi-Fi communications function. Optionally, the station may support the 802.11ax standard.

FIG. 2 is a schematic diagram of a system of a typical WLAN deployment scenario. The system includes one AP and three STAs. The AP separately communicates with a STA 1, a STA 2, and a STA 3. Each of the AP and the STAs 1 to 3 may be used as a first station or a second station.

It should be noted that, channel division in the WLAN is shown in FIG. 3a, channels are numbered, and each of numbers 0 to 7 represents one 20 MHz channel. The number 0 channel represents a primary 20 MHz channel. The number 1 channel represents a secondary 20 MHz channel. The number 0 channel and the number 1 channel form a primary 40 MHz channel. The number 2 channel and the number 3 channel form a secondary 40 MHz channel. The number 0 channel, the number 1 channel, the number 2 channel, and the number 3 channel form a primary 80 MHz channel. The number 4 channel, the number 5 channel, the number 6 channel, and the number 7 channel form a secondary 80 MHz channel. The number 4 channel is adjacent to the number 5 channel. The number 5 channel is adjacent to the number 6 channel. The number 6 channel is adjacent to the number 7 channel.

It should be understood that, in current WLAN standards, in a multichannel composition rule, one unique 20 MHz channel is a primary 20 MHz channel, and adjacent 20 MHz channel on the left or right of the primary 20 MHz channel is a secondary 20 MHz channel (The left or the right 20 MHz channel may be randomly selected, but only one can be selected. In addition, being left may also be described as being below, and being right may also be described as being above. Being left or below indicates that a frequency is lower than a frequency of the primary 20 MHz channel, and being right or above indicates that a frequency is higher than the frequency of the primary 20 MHz channel). The primary 20 MHz channel and the secondary 20 MHz channel form a primary 40 MHz channel. Adjacent 40 MHz channel on the left or right of the primary 40 MHz channel is a secondary 40 MHz channel (the left or the right 40 MHz may be randomly selected, but only one can be selected), and the primary 40 MHz channel and the secondary 40 MHz channel form a primary 80 MHz channel. 80 MHz channel on the left or right of the primary 80 MHz channel is a secondary 80 MHz channel (the left or the right 80 MHz channel may be randomly selected, but only one can be selected). When the primary 80 MHz channel is adjacent to the secondary 80 MHz channel, the primary 80 MHz channel and the secondary 80 MHz channel form a 160 MHz channel. When the primary 80 MHz channel is not adjacent to the secondary 80 MHz channel, the primary 80 MHz channel and the secondary 80 MHz channel form an (80+80) MHz channel.

Based on the foregoing rule, the channels 0 to 7 may be arranged in multiple manners shown in FIG. 3b. In addition, two 20 MHz channels of secondary 40 MHz and four 20 MHz channels of secondary 80 MHz may be numbered from left to right or from right to left. This is not limited in the present invention. For convenience of description, in all embodiments of the present invention, for the channel division in the WLAN, the number 0 channel is used as a primary 20 MHz channel.

It should be noted that, a data frame in the embodiments of the present invention is a possible 802.11ax data frame, and a data frame in the WLAN is generally a Physical Protocol Data Unit (PPDU). As shown in FIG. 4, the PPDU includes a preamble field and a data field, and the preamble field includes a legacy preamble field and a high efficiency preamble field. The Legacy Preamble (L-P) field keeps compatible with an existing WLAN standard device, and includes an Legacy Short Training Field L-STF, an Legacy Long Training Field (L-LTF), an Legacy Signaling Field, (L-SIG), and an Repeated Legacy Signaling Field (RL-SIG). The legacy preamble field is followed by a high efficiency signal field A (HE-SIG-A), a high efficiency signal field B (HE-SIG-B), and an other HE preamble. It should be noted that other HE preamble is one field or a combination of multiple fields, and is not particularly limited to a specific field. The other HE preamble field is followed by the data field (Data). In a further possible WLAN standard, a name of the standard, a name of a field, or the like may be replaced with any other name, and shall not be construed as a limitation to the protection scope of the present invention. Moreover, descriptions of the data frame are also applicable to subsequent embodiments.

Figure 5:
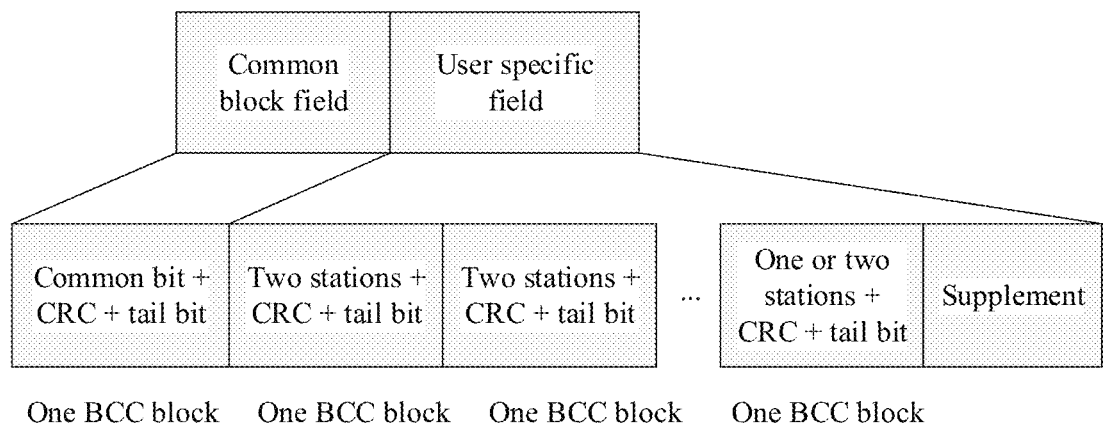
FIG. 5 is diagram of a frame structure of an HE-SIG-B of a physical protocol data unit of a system according to an embodiment of the present invention.

It should be noted that the HE-SIG-B field is separately encoded on each 20 MHz channel. An encoding structure is shown in FIG. 5, and includes a common block field and a user specific field.

The common block field includes information related to resource allocation, such as frequency domain RU allocation information, an RU allocated to MU-MIMO, and a quantity of users included in the MU-MIMO. The user specific field includes multiple user block fields. Each user block field includes information that is needed to analyze data of two stations. If a quantity of user fields indicated by RU allocation signaling of the common block field is an odd number, the last user block field may include information about only one station.

Figure 6:
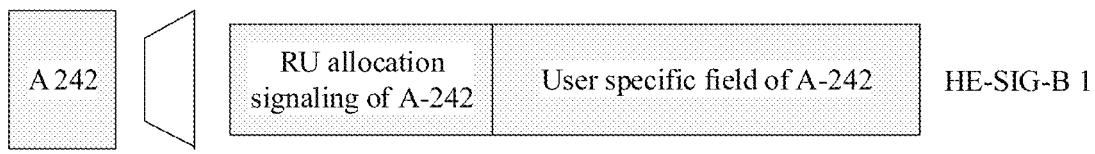
FIG. 6 is a diagram of allocating a resource unit of an HE-SIG-B of a physical protocol data unit in a bandwidth of 20 MHz.
Figure 7:
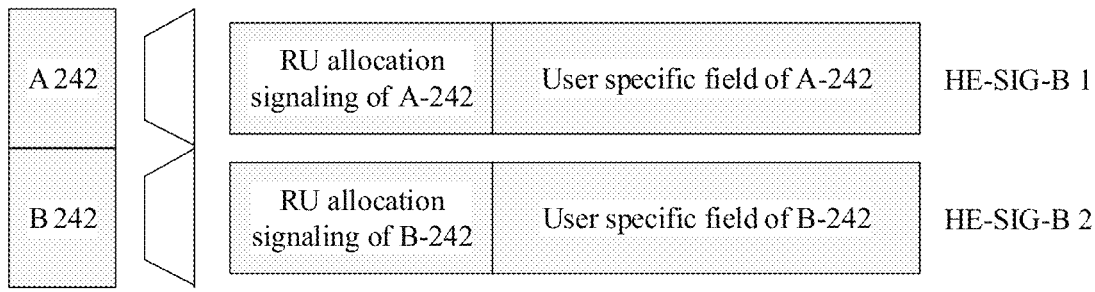
FIG. 7 is a diagram of allocating a resource unit of an HE-SIG-B of a physical protocol data unit in a bandwidth of 40 MHz.

For a PPDU of 20 MHz, refer to FIG. 6. For a PPDU of 40 MHz, as shown in FIG. 7, a common block field and a user specific field of a station are transmitted on 20 MHz having the same station data.

Figure 8:
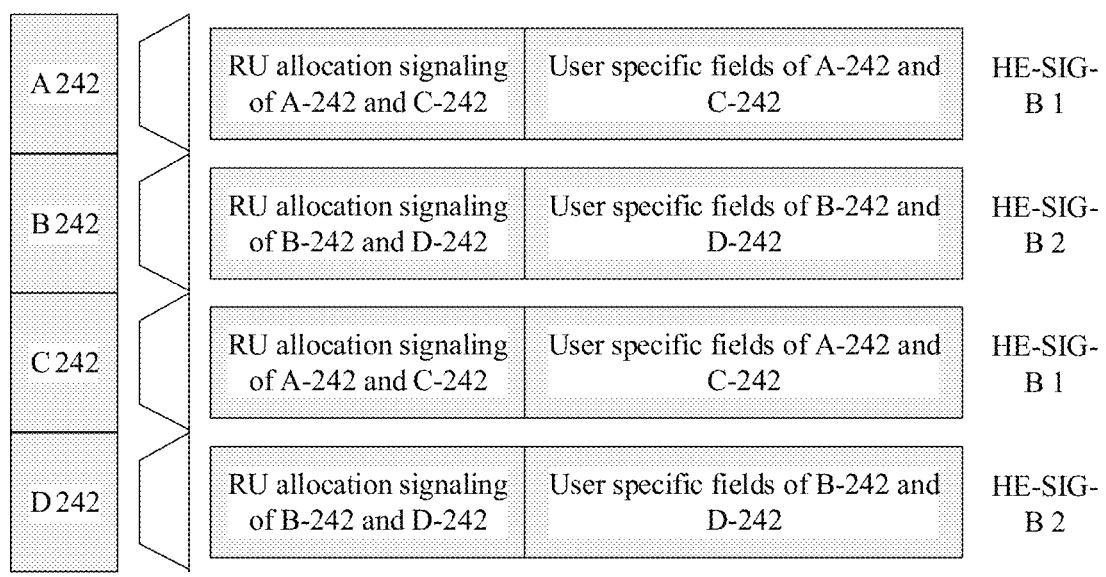
FIG. 8 is a diagram of allocating a resource unit of an HE-SIG-B of a physical protocol data unit in a bandwidth of 80 MHz.

For a PPDU of 80 MHz, a frequency mapping of a common block field and a user specific field is shown in FIG. 8. Content of an HE-SIG-B on the first 20 MHz channel and the third 20 MHz channel that are arranged from top to bottom according to frequencies is the same. Information carried on these channels is an HE-SIG-B 1, and the HE-SIG-B 1 includes signaling information of all stations whose data occupies at least some subcarriers of A242 or C242. Similarly, content of an HE-SIG-B on the second 20 MHz channel and the fourth 20 MHz channel that are arranged from top to bottom according to frequencies is the same. Information carried on these channels is an HE-SIG-B 2, and the HE-SIG-B 2 includes signaling information of all stations whose data occupies at least some subcarriers of B242 or D242.

For a PPDU of 160 MHz, a frequency mapping of a common block field and a user specific field is shown in FIG. 9. Content of an HE-SIG-B on the first 20 MHz channel, the third 20 MHz channel, the fifth 20 MHz channel, and the seventh 20 MHz channel that are arranged from top to bottom according to frequencies is the same. Information carried on these channels is an HE-SIG-B 1, and the HE-SIG-B 1 includes signaling information of all stations whose data occupies at least some subcarriers of A1-242, C1-242, A2-242, or C2-242. Similarly, content of an HE-SIG-B on the second 20 MHz channel, the fourth 20 MHz channel, the sixth 20 MHz channel, and the eighth 20 MHz channel that are arranged from top to bottom according to frequencies is the same. Information carried on these channels is an HE-SIG-B 2, and the HE-SIG-B 2 includes signaling information of all stations whose data occupies at least some subcarriers of B1-242, D1-242, B2-242, or D2-242.

For convenience of description, the descriptions of the PPDU are also applicable to all the embodiments.

Embodiment 1

Figures 10, 11:
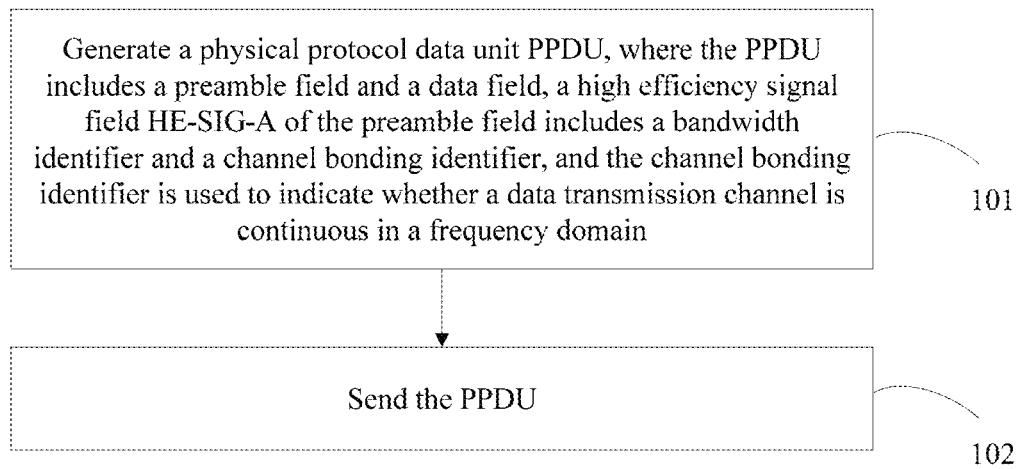
FIG. 10 is a flowchart of a method according to Embodiment 1 of the present invention.
FIG. 11 is a channel indication diagram of an implementation 1 according to Embodiment 1 of the present invention.

Embodiment 1 of the present invention provides a method, which is applied to a WLAN, for indicating a channel. The method may be applied to a station, for example, the AP and the STA 1 to the STA 3 in FIG. 2. The station may support a next-generation WLAN standard, for example, the 802.11ax standard. FIG. 10 is an example block diagram of the method for indicating a channel. Specific steps are as follows:

Step 101: Generate a physical protocol data unit PPDU, where the PPDU includes a preamble field and a data field, a high efficiency signal field HE-SIG-A of the preamble field includes a bandwidth identifier and a channel bonding identifier, and the channel bonding identifier is used to indicate whether a data transmission channel is continuous in a frequency domain.

Step 102: Send the PPDU.

Specifically, the channel bonding (CB) identifier includes at least one bit, and one bit is used as an example below for description. If the channel bonding identifier is a first value, the data transmission channel is continuous in the frequency domain; or if the channel bonding identifier is a second value, the data transmission channel includes multiple discontinuous channels in the frequency domain.

It should be noted that the first value and the second value of the channel bonding identifier are not limited in the present invention. The first value is "0" and the second value is "1". The first value is "1" and the second value is "0". The foregoing two cases are both in the protection scope of the present invention. For convenience of description, the case in which the first value is "0" and the second value is "1" is specifically used below for description.

Optionally, in the present invention, indicating the data transmission channel by using both the bandwidth identifier and the channel bonding identifier includes at least 10 implementations.

Implementation 1: If the channel bonding identifier is the first value, and the bandwidth identifier is a first value, the data transmission channel includes a primary 20 MHz channel;

if the channel bonding identifier is the first value, and the bandwidth identifier is a second value, the data transmission channel includes a primary 20 MHz channel and a secondary 20 MHz channel;

if the channel bonding identifier is the first value, and the bandwidth identifier is a third value, the data transmission channel includes a primary 20 MHz channel, a secondary 20 MHz channel, and a secondary 40 MHz channel;

if the channel bonding identifier is the first value, and the bandwidth identifier is a fourth value, the data transmission channel includes a primary 20 MHz channel, a secondary 20 MHz channel, a secondary 40 MHz channel, and a secondary 80 MHz channel;

if the channel bonding identifier is the second value, and the bandwidth identifier is a first value, the data transmission channel includes primary 20 MHz and a secondary 40 MHz channel;

if the channel bonding identifier is the second value, and the bandwidth identifier is a second value, the data transmission channel includes a primary 20 MHz channel and a secondary 80 MHz channel;

if the channel bonding identifier is the second value, and the bandwidth identifier is a third value, the data transmission channel includes a primary 20 MHz channel, a secondary 20 MHz channel, and a secondary 80 MHz channel; or if the channel bonding identifier is the second value, and the bandwidth identifier is a fourth value, the data transmission channel includes a primary 20 MHz channel, a secondary 40 MHz channel, and a secondary 80 MHz channel.

It should be noted that the bandwidth (BW) identifier includes at least two bits, and two bits are used as an example below for description. Further, a value range of the first value, the second value, the third value, and the fourth value of the bandwidth identifier is [00, 01, 10, 11]. A specific mapping relationship of a value of the bandwidth identifier is not limited in the present invention. For convenience of description, descriptions are provided below with reference to a case in which the first value is "00", the second value is "01", the third value is "10", and the fourth value is "11".

Specifically, the implementation 1 is specifically described with reference to FIG. 11.

For a continuous channel in the frequency domain:

When CB=0 and BW=00, a data transmission bandwidth channel is a primary 20 MHz channel, that is, a channel 0.

When CB=0 and BW=01, the data transmission channel includes a primary 20 MHz channel and a secondary 20 MHz channel, that is, channels 0 and 1.

When CB=0 and BW=10, the data transmission channel includes a primary 20 MHz channel, a secondary 20 MHz channel, and a secondary 40 MHz channel, that is, channels 0 to 3.

When CB=0 and BW=11, the data transmission channel includes a primary 20 MHz channel, a secondary 20 MHz channel, and a secondary 40 MHz channel, that is, channels 0 to 7.

For discontinuous channels in the frequency domain:

When CB=1 and BW=00, the data transmission channel includes primary 20 MHz and a secondary 40 MHz channel, that is, the channels 0, 2, and 3.

When CB=1 and BW=01, the data transmission channel includes a primary 20 MHz channel and a secondary 80 MHz channel, that is, the channels 0 and 4 to 7.

When CB=1 and BW=10, the data transmission channel includes a primary 20 MHz channel, a secondary 20 MHz channel, and a secondary 80 MHz channel, that is, the channels 0, 1, and 4 to 7.

When CB=1 and BW=11, the data transmission channel includes a primary 20 MHz channel, a secondary 40 MHz channel, and a secondary 80 MHz channel, that is, the channels 0 and 2 to 7.

Implementation 2:

If the bandwidth identifier is a first value, the data transmission channel includes a primary 20 MHz channel;

if the bandwidth identifier is a second value, the data transmission channel includes a primary 20 MHz channel and a secondary 20 MHz channel;

if the bandwidth identifier is a third value, and the channel bonding identifier is the first value, the data transmission channel includes a primary 20 MHz channel, a secondary 20 MHz channel, and a secondary 40 MHz channel;

if the bandwidth identifier is a third value, and the channel bonding identifier is the second value, the data transmission channel includes a primary 20 MHz channel and a secondary 40 MHz channel;

if the bandwidth identifier is a fourth value, and the channel bonding identifier is the first value, the data transmission channel is 160 MHz or (80+80) MHz, and in this case, the data transmission channel includes a primary 20 MHz channel, a secondary 20 MHz channel, a secondary 40 MHz channel, and a secondary 80 MHz channel; or if the bandwidth identifier is a fourth value, and the channel bonding identifier is the second value, the data transmission channel is 160 MHz or (80+80) MHz, and in this case, the data transmission channel includes a primary 20 MHz channel, a secondary 20 MHz channel, and a secondary 80 MHz channel.

With reference to FIG. 12, a mapping relationship between the channel bonding identifier and the bandwidth identifier, and the channel in the implementation 2 is described.

When BW=00, a data transmission bandwidth is a primary 20 MHz channel, that is, the channel 0. A value of the channel bonding identifier may be 0, 1, or reserved.

When BW=01, the data transmission bandwidth is a primary 20 MHz channel and a secondary 20 MHz channel, that is, the channels 0 and 1. The value of the channel bonding identifier may be 0, 1, or reserved.

When BW=10 and CB=0, the data transmission bandwidth is a primary 20 MHz channel, a secondary 20 MHz channel, and a secondary 40 MHz channel, that is, the channels 0 to 3.

When BW=10 and CB=1, the data transmission bandwidth is a primary 20 MHz channel and a secondary 40 MHz channel, that is, the channels 0, 2, and 3.

When BW=11 and CB=0, the data transmission bandwidth is a primary 20 MHz channel, a secondary 20 MHz channel, a secondary 40 MHz channel, and a secondary 80 MHz channel, that is, the channels 0 to 7.

When BW=11 and CB=1, the data transmission bandwidth is a primary 20 MHz channel, a secondary 20 MHz channel, and a secondary 80 MHz channel, that is, the channels 0, 1, and 4 to 7.

Implementation 3:

If the bandwidth identifier is a first value, the data transmission channel includes a primary 20 MHz channel;

if the bandwidth identifier is a second value, the data transmission channel includes a primary 20 MHz channel and a secondary 20 MHz channel;

if the bandwidth identifier is a third value, and the channel bonding identifier is the first value, the data transmission channel includes a primary 20 MHz channel, a secondary 20 MHz channel, and a secondary 40 MHz channel;

if the bandwidth identifier is a third value, and the channel bonding identifier is the second value, the data transmission channel includes a primary 20 MHz channel and a secondary 40 MHz channel;

if the bandwidth identifier is a fourth value, and the channel bonding identifier is the first value, the data transmission channel is 160 MHz or (80+80) MHz, and in this case, the data transmission channel includes a primary 20 MHz channel, a secondary 20 MHz channel, a secondary 40 MHz channel, and a secondary 80 MHz channel; or if the bandwidth identifier is a fourth value, and the channel bonding identifier is the second value, the data transmission channel is 160 MHz or (80+80) MHz, and in this case, the data transmission channel includes a primary 20 MHz channel and a secondary 80 MHz channel.

With reference to FIG. 13, a mapping relationship between the channel bonding identifier and the bandwidth identifier, and the channel in implementation 3 is described.

When BW=00, a data transmission bandwidth is a primary 20 MHz channel, that is, the channel 0. When the data transmission bandwidth is less than or equal to 40 MHz, a value of the channel bonding identifier may be 0, 1, or reserved.

When BW=01, the data transmission bandwidth is a primary 20 MHz channel and a secondary 20 MHz channel, that is, the channels 0 and 1. When the data transmission bandwidth is less than or equal to 40 MHz, the value of the channel bonding identifier may be 0, 1, or reserved.

When BW=10 and CB=0, the data transmission bandwidth is a primary 20 MHz channel, a secondary 20 MHz channel, and a secondary 40 MHz channel, that is, the channels 0 to 3.

When BW=10 and CB=1, the data transmission bandwidth is a primary 20 MHz channel and a secondary 40 MHz channel, that is, the channels 0, 2, and 3.

When BW=11 and CB=0, the data transmission bandwidth is a primary 20 MHz channel, a secondary 20 MHz channel, a secondary 40 MHz channel, and a secondary 80 MHz channel, that is, the channels 0 to 7.

When BW=11 and CB=1, the data transmission bandwidth is a primary 20 MHz channel and a secondary 80 MHz channel, that is, the channels 0 and 4 to 7.

Implementation 4:

If the bandwidth identifier is a first value, the data transmission channel includes a primary 20 MHz channel;

if the bandwidth identifier is a second value, the data transmission channel includes a primary 20 MHz channel and a secondary 20 MHz channel;

if the bandwidth identifier is a third value, and the channel bonding identifier is the first value, the data transmission channel includes a primary 20 MHz channel, a secondary 20 MHz channel, and a secondary 40 MHz channel;

if the bandwidth identifier is a third value, and the channel bonding identifier is the second value, the data transmission channel includes a primary 20 MHz channel and a secondary 40 MHz channel;

if the bandwidth identifier is a fourth value, and the channel bonding identifier is the first value, the data transmission channel is 160 MHz or (80+80) MHz, and in this case, the data transmission channel includes a primary 20 MHz channel, a secondary 20 MHz channel, a secondary 40 MHz channel, and a secondary 80 MHz channel; or if the bandwidth identifier is a fourth value, and the channel bonding identifier is the second value, the data transmission channel is 160 MHz or (80+80) MHz, and in this case, the data transmission channel includes a primary 20 MHz channel, a secondary 40 MHz channel, and a secondary 80 MHz channel.

With reference to FIG. 14, a mapping relationship between the channel bonding identifier and the bandwidth identifier, and the channel in manner 4 is described.

When BW=00, a data transmission bandwidth is a primary 20 MHz channel, that is, the channel 0. A value of the channel bonding identifier may be 0, 1, or reserved.

When BW=01, the data transmission bandwidth is a primary 20 MHz channel and a secondary 20 MHz channel, that is, the channels 0 and 1. The value of the channel bonding identifier may be 0, 1, or reserved.

When BW=10 and CB=0, the data transmission bandwidth is a primary 20 MHz channel, a secondary 20 MHz channel, and a secondary 40 MHz channel, that is, the channels 0 to 3.

When BW=10 and CB=1, the data transmission bandwidth is a primary 20 MHz channel and a secondary 40 MHz channel, that is, the channels 0, 2, and 3.

When BW=11 and CB=0, the data transmission bandwidth is a primary 20 MHz channel, a secondary 20 MHz channel, a secondary 40 MHz channel, and a secondary 80 MHz channel, that is, the channels 0 to 7.

When BW=11 and CB=1, the data transmission bandwidth is a primary 20 MHz channel, a secondary 40 MHz channel, and a secondary 80 MHz channel, that is, the channels 0 and 2 to 7.

Implementation 5:

If the bandwidth identifier is a first value, the data transmission channel includes a primary 20 MHz channel;

if the bandwidth identifier is a second value, the data transmission channel includes a primary 20 MHz channel and a secondary 20 MHz channel;

if the bandwidth identifier is a third value, and the channel bonding identifier is the first value, the data transmission channel includes a primary 20 MHz channel, a secondary 20 MHz channel, and a secondary 40 MHz channel;

if the bandwidth identifier is a third value, and the channel bonding identifier is the second value, the data transmission channel includes a primary 20 MHz channel and a secondary 40 MHz channel; or if the bandwidth identifier is a fourth value, the data transmission channel includes a primary 20 MHz channel, a secondary 20 MHz channel, a secondary 40 MHz channel, and a secondary 80 MHz channel.

With reference to FIG. 15, a mapping relationship between the channel bonding identifier and the bandwidth identifier, and the channel in manner 5 is described.

When BW=00, a data transmission bandwidth is a primary 20 MHz channel, that is, the channel 0. A value of the channel bonding identifier may be 0, 1, or reserved.

When BW=01, the data transmission bandwidth is a primary 20 MHz channel and a secondary 20 MHz channel, that is, the channels 0 and 1. The value of the channel bonding identifier may be 0, 1, or reserved.

When BW=10 and CB=0, the data transmission bandwidth is a primary 20 MHz channel, a secondary 20 MHz channel, and a secondary 40 MHz channel, that is, the channels 0 to 3.

When BW=10 and CB=1, the data transmission bandwidth is a primary 20 MHz channel and a secondary 40 MHz channel, that is, the channels 0, 2, and 3.

When BW=11, the data transmission bandwidth is a primary 20 MHz channel, a secondary 20 MHz channel, a secondary 40 MHz channel, and a secondary 80 MHz channel, that is, the channels 0 to 7. The value of the channel bonding identifier may be 0, 1, or reserved.

Implementation 6:

If the bandwidth identifier is a first value, the data transmission channel includes a primary 20 MHz channel;

if the bandwidth identifier is a second value, the data transmission channel includes a primary 20 MHz channel and a secondary 20 MHz channel;

if the bandwidth identifier is a third value, the data transmission channel includes a primary 20 MHz channel, a secondary 20 MHz channel, and a secondary 40 MHz channel;

if the bandwidth identifier is a fourth value, and the channel bonding identifier is the first value, the data transmission channel includes a primary 20 MHz channel, a secondary 20 MHz channel, a secondary 40 MHz channel, and a secondary 80 MHz channel;

or if the bandwidth identifier is a fourth value, and the channel bonding identifier is the second value, the data transmission channel includes a primary 20 MHz channel, a secondary 20 MHz channel, and a secondary 80 MHz channel.

With reference to FIG. 16, a mapping relationship between the channel bonding identifier and the bandwidth identifier, and the channel in manner 6 is described.

When BW=00, a data transmission bandwidth is a primary 20 MHz channel, that is, the channel 0. A value of the channel bonding identifier may be 0, 1, or reserved.

When BW=01, the data transmission bandwidth is a primary 20 MHz channel and a secondary 20 MHz channel, that is, the channels 0 and 1. The value of the channel bonding identifier may be 0, 1, or reserved.

When BW=10, the data transmission bandwidth is a primary 20 MHz channel, a secondary 20 MHz channel, and a secondary 40 MHz channel, that is, the channels 0 to 3. The value of the channel bonding identifier may be 0, 1, or reserved.

When BW=11 and CB=0, the data transmission bandwidth is a primary 20 MHz channel, a secondary 40 MHz channel, and a secondary 80 MHz channel, that is, the channels 0 to 7.

When BW=11 and CB=1, the data transmission bandwidth is a primary 20 MHz channel, a secondary 20 MHz channel, and a secondary 80 MHz channel, that is, the channels 0, 1, and 4 to 7.

Implementation 7:

In the implementation 7, there are following six indicated bandwidth modes:

Mode 1: a primary 20 MHz channel.

Mode 2: a primary 20 MHz channel and a secondary 20 MHz channel.

Mode 3: a primary 20 MHz channel and a secondary 40 MHz channel.

Mode 4: a primary 20 MHz channel, a secondary 20 MHz channel, and a secondary 40 MHz channel.

Mode 5: a primary 20 MHz channel and a secondary 80 MHz channel; or a primary 20 MHz channel, a secondary 40 MHz channel, and a secondary 80 MHz channel.

Mode 6: a primary 20 MHz channel, a secondary 20 MHz channel, and a secondary 80 MHz channel; or a primary 20 MHz channel, a secondary 20 MHz channel, a secondary 40 MHz channel, and a secondary 80 MHz channel.

For the indication manners in the six modes, indication is performed by using both a BW field (two bits) and a CB field (one bit). {BW, CB} has eight indication manners in total: {0, 0}, {0, 1}, {1, 0}, {1, 1}, {2, 0}, {2, 1}, {3, 0}, and {3, 1}, as shown in Table 1. In principle, for each channel mode, one or more indication manners may be randomly selected from the eight indication manners without repetition. A corresponding manner shown in Table 1 is recommended in this embodiment. Another manner of corresponding between an indication manner and a channel mode is also applicable to this embodiment.

TABLE 1

| | Mode | | | | | |
|---|---|---|---|---|---|---|
| | 1 | 2 | 3 | 4 | 5 | 6 |
| {BW, CB} | {0, 0} or {0,1} | {1, 0} or {1, 1} | {2, 0} | {2, 1} | {3, 0} | {3, 1} |

It can be learned from FIG. 17a and FIG. 17b that, for each indication manner, a receiving station may obtain an HE-SIG-B 1 and an HE-SIG-B 2 from a fixed location (for a 20 MHz channel mode, only the HE-SIG-B 1 exists and no HE-SIG-B 2 exists). Even if one indication manner corresponds to multiple bandwidth modes, obtaining of the HE-SIG-B 1 and the HE-SIG-B 2 is not affected. When {BW, CB}={2, 0}, either of the HE-SIG-B 1 and the HE-SIG-B 2 may be obtained by using a primary 20 MHz channel, and the other part of an HE-SIG-B is obtained by using a 20 MHz channel of secondary 40 MHz. When specific frequencies are arranged in descending order, when the primary 20 MHz channel is on a 20 MHz channel that is numbered by using an odd number (shown in FIG. 17a), the other part of the HE-SIG-B may be obtained by using a 20 MHz channel, which is numbered by using an even number, of the secondary 40 MHz channel. In contrast, when the primary 20 MHz channel is on a 20 MHz channel that is numbered by using an even number (shown in FIG. 17b), the other part of the HE-SIG-B may be obtained by using a 20 MHz channel, which is numbered by using an odd number, of the secondary 40 MHz channel.

When {BW, CB}={2, 1}, the primary 20 MHz channel and the secondary 20 MHz channel include an HE-SIG-B 1 and an HE-SIG-B 2, the secondary 40 MHz channel also includes the HE-SIG-B 1 and the HE-SIG-B 2, and the receiving station may determine by itself from which to obtain the HE-SIG-B 1 and the HE-SIG-B 2.

It should be noted that descriptions of the HE-SIG-B 1 and the HE-SIG-B 2 in this implementation are also applicable to other implementations of the present invention.

Implementation 8:

In this embodiment, a secondary 80 MHz channel is divided into two continuous 40 MHz channels, and the two 40 MHz channels may be classified according to different rules. For example, the two 40 MHz channels are classified into an upper 40 MHz channel (a 40 MHz channel having a higher frequency) and a lower 40 MHz channel (a 40 MHz channel having a lower frequency) according to frequencies. For another example, the two 40 MHz channels are classified into a near 40 MHz channel and a far 40 MHz channel according to distances to the primary 20 MHz channel. A classification rule is not limited in this patent solution, and an indication principle thereof is similar. For convenience, an example of the upper 40 MHz channel and the lower 40 MHz channel is used in descriptions of subsequent embodiments for description.

In the implementation 8, there are following six bandwidth modes shown in FIG. 18a:

Mode 1: a primary 20 MHz channel.

Mode 2: a primary 20 MHz channel and a secondary 20 MHz channel.

Mode 3: a primary 20 MHz channel and a secondary 40 MHz channel.

Mode 4: a primary 20 MHz channel, a secondary 20 MHz channel, and a secondary 40 MHz channel.

Mode 5: a primary 20 MHz channel and a lower 40 MHz channel of secondary 80 MHz channel; or a primary 20 MHz channel, a secondary 40 MHz channel, and a lower 40 MHz channel of secondary 80 MHz channel; or a primary 20 MHz channel and a secondary 80 MHz channel; or a primary 20 MHz channel, a secondary 40 MHz channel, and a secondary 80 MHz channel.

Mode 6: a primary 20 MHz channel, a secondary 20 MHz channel, and a lower 40 MHz channel of secondary 80 MHz channel; or a primary 20 MHz channel, a secondary 20 MHz channel, and an upper 40 MHz channel of secondary 80 MHz channel; or a primary 20 MHz channel, a secondary 20 MHz channel, and a secondary 80 MHz channel; or a primary 20 MHz channel, a secondary 20 MHz channel, a secondary 40 MHz channel, and a lower 40 MHz channel of secondary 80 MHz channel; or a primary 20 MHz channel, a secondary 20 MHz channel, a secondary 40 MHz channel, and an upper 40 MHz channel of secondary 80 MHz channel; or a primary 20 MHz channel, a secondary 20 MHz channel, a secondary 40 MHz channel, and a secondary 80 MHz channel.

For the indication manners in the six modes, indication is performed by using both a BW field (two bits) and a CB field (one bit). {BW, CB} has eight indication manners in total:

{0, 0}, {0, 1}, {1, 0}, {1, 1}, {2, 0}, {2, 1}, {3, 0}, and {3, 1}, as shown in Table 2. In principle, for each channel mode, one or more indication manners may be randomly selected from the eight indication manners without repetition. A corresponding manner shown in Table 2 is recommended in this embodiment. Another manner of corresponding between an indication manner and a channel mode is also applicable to this embodiment.

TABLE 2

| | Mode | | | | | |
|---|---|---|---|---|---|---|
| | 1 | 2 | 3 | 4 | 5 | 6 |
| {BW, CB} | {0, 0} or {0, 1} | {1, 0} or {1, 1} | {2, 0} | {2, 1} | {3, 0} | {3, 1} |

FIG. 18b shows another implementation, and the implementation includes the following six channel modes:

Mode 1: a primary 20 MHz channel.

Mode 2: a primary 20 MHz channel and a secondary 20 MHz channel.

Mode 3: a primary 20 MHz channel and a secondary 40 MHz channel.

Mode 4: a primary 20 MHz channel, a secondary 20 MHz channel, and a secondary 40 MHz channel.

Mode 5: a primary 20 MHz channel and an upper 40 MHz channel of secondary 80 MHz channel; or a primary 20 MHz channel, a secondary 40 MHz channel, and an upper 40 MHz channel of secondary 80 MHz channel; or a primary 20 MHz channel and a secondary 80 MHz channel; or a primary 20 MHz channel, a secondary 40 MHz channel, and a secondary 80 MHz channel.

Mode 6: a primary 20 MHz channel, a secondary 20 MHz channel, and a lower 40 MHz channel of secondary 80 MHz channel; or a primary 20 MHz channel, a secondary 20 MHz channel, and an upper 40 MHz channel of secondary 80 MHz channel; or a primary 20 MHz channel, a secondary 20 MHz channel, and a secondary 80 MHz channel; or a primary 20 MHz channel, a secondary 20 MHz channel, a secondary 40 MHz channel, and a lower 40 MHz channel of secondary 80 MHz channel; or a primary 20 MHz channel, a secondary 20 MHz channel, a secondary 40 MHz channel, and an upper 40 MHz channel of secondary 80 MHz channel; or a primary 20 MHz channel, a secondary 20 MHz channel, a secondary 40 MHz channel, and a secondary 80 MHz channel.

For the indication manners in the six modes, indication is performed by using both a BW field (two bits) and a CB field (one bit). {BW, CB} has eight indication manners in total: {0, 0}, {0, 1}, {1, 0}, {1, 1}, {2, 0}, {2, 1}, {3, 0}, and {3, 1}, as shown in Table 3. In principle, for each channel mode, one or more indication manners may be randomly selected from the eight indication manners without repetition. A corresponding manner shown in Table 3 is recommended in this embodiment. Another manner of corresponding between an indication manner and a channel mode is also applicable to this embodiment.

TABLE 3

| | Mode | | | | | |
|---|---|---|---|---|---|---|
| | 1 | 2 | 3 | 4 | 5 | 6 |
| {BW, CB} | {0, 0} or {0, 1} | {1, 0} or {1, 1} | {2, 0} | {2, 1} | {3, 0} | {3, 1} |

FIG. 18c shows another implementation, and the implementation includes the following seven channel modes:

Mode 1: a primary 20 MHz channel.

Mode 2: a primary 20 MHz channel and a secondary 20 MHz channel.

Mode 3: a primary 20 MHz channel and a secondary 40 MHz channel.

Mode 4: a primary 20 MHz channel, a secondary 20 MHz channel, and a secondary 40 MHz channel.

Mode 5: a primary 20 MHz channel and a lower 40 MHz channel of secondary 80 MHz channel; or a primary 20 MHz channel, a secondary 40 MHz channel, and a lower 40 MHz channel of secondary 80 MHz channel; or a primary 20 MHz channel and a secondary 80 MHz channel; or a primary 20 MHz channel, a secondary 40 MHz channel, and a secondary 80 MHz channel.

Mode 6: a primary 20 MHz channel, a secondary 20 MHz channel, and a lower 40 MHz channel of secondary 80 MHz channel; or a primary 20 MHz channel, a secondary 20 MHz channel, and an upper 40 MHz channel of secondary 80 MHz channel; or a primary 20 MHz channel, a secondary 20 MHz channel, and a secondary 80 MHz channel; or a primary 20 MHz channel, a secondary 20 MHz channel, a secondary 40 MHz channel, and a lower 40 MHz channel of secondary 80 MHz channel; or a primary 20 MHz channel, a secondary 20 MHz channel, a secondary 40 MHz channel, and an upper 40 MHz channel of secondary 80 MHz channel; or a primary 20 MHz channel, a secondary 20 MHz channel, a secondary 40 MHz channel, and a secondary 80 MHz channel.

Mode 7: a primary 20 MHz channel and an upper 40 MHz channel of secondary 80 MHz channel; or a primary 20 MHz channel, a secondary 40 MHz channel, and an upper 40 MHz channel of secondary 80 MHz channel; or a primary 20 MHz channel and a secondary 80 MHz channel; or a primary 20 MHz channel, a secondary 40 MHz channel, and a secondary 80 MHz channel.

For the indication manners in the seven modes, indication is performed by using both a BW field (two bits) and a CB field (one bit). {BW, CB} has eight indication manners in total: {0, 0}, {0, 1}, {1, 0}, {1,1}, {2, 0}, {2, 1}, {3, 0}, and {3, 1}, as shown in Table 4. In principle, for each channel mode, one or more indication manners may be randomly selected from the eight indication manners without repetition. A corresponding manner shown in Table 4 is described in this embodiment. Another manner of corresponding between an indication manner and a channel mode is also applicable to this embodiment.

TABLE 4

| {BW, CB} | Mode | | | | | | |
|---|---|---|---|---|---|---|---|
| | 1 | 2 | 3 | 4 | 5 | 6 | 7 |
| {BW, CB} | {0, 0} | {1, 0} or {1, 1} | {2, 0} | {2, 1} | {3, 0} | {3, 1} | {0, 1} |

FIG. 18d shows another implementation, and the implementation includes the following eight channel modes:

Mode 1: a primary 20 MHz channel.

Mode 2: a primary 20 MHz channel and a secondary 20 MHz channel.

Mode 3: a primary 20 MHz channel and a secondary 40 MHz channel.

Mode 4: a primary 20 MHz channel, a secondary 20 MHz channel, and a secondary 40 MHz channel.

Mode 5: a primary 20 MHz channel and a lower 40 MHz channel of secondary 80 MHz channel; or a primary 20 MHz channel, a secondary 40 MHz channel, and a lower 40 MHz channel of secondary 80 MHz channel; or a primary 20 MHz channel and a secondary 80 MHz channel; or a primary 20 MHz channel, a secondary 40 MHz channel, and a secondary 80 MHz channel.

Mode 6: a primary 20 MHz channel, a secondary 20 MHz channel, and a lower 40 MHz channel of secondary 80 MHz channel; or a primary 20 MHz channel, a secondary 20 MHz channel, and an upper 40 MHz channel of secondary 80 MHz channel; or a primary 20 MHz channel, a secondary 20 MHz channel, and a secondary 80 MHz channel; or a primary 20 MHz channel, a secondary 20 MHz channel, a secondary 40 MHz channel, and a lower 40 MHz channel of secondary 80 MHz channel; or a primary 20 MHz channel, a secondary 20 MHz channel, a secondary 40 MHz channel, and an upper 40 MHz channel of secondary 80 MHz channel; or a primary 20 MHz channel, a secondary 20 MHz channel, a secondary 40 MHz channel, and a secondary 80 MHz channel.

Mode 7: a primary 20 MHz channel and an upper 40 MHz channel of secondary 80 MHz channel; or a primary 20 MHz channel, a secondary 40 MHz channel, and an upper 40 MHz channel of secondary 80 MHz channel; or a primary 20 MHz channel and a secondary 80 MHz channel; or a primary 20 MHz channel, a secondary 40 MHz channel, and a secondary 80 MHz channel.

Mode 8: a primary 20 MHz channel, a secondary 40 MHz channel, and a lower 40 MHz channel of secondary 80 MHz channel; or a primary 20 MHz channel, a secondary 40 MHz channel, and an upper 40 MHz channel of secondary 80 MHz channel; or a primary 20 MHz channel, a secondary 40 MHz channel, and a secondary 80 MHz channel.

For the indication manners in the eight modes, indication is performed by using both a BW field (two bits) and a CB field (one bit). {BW, CB} has eight indication manners in total: {0, 0}, {0, 1}, {1, 0}, {1, 1}, {2, 0}, {2, 1}, {3, 0}, and {3, 1}, as shown in Table 5. In principle, for each channel mode, one or more indication manners may be randomly selected from the eight indication manners without repetition. A corresponding manner shown in Table 5 is described in this embodiment. Another manner of corresponding between an indication manner and a channel mode is also applicable to this embodiment.

TABLE 5

| | Mode | | | | | | | |
|---|---|---|---|---|---|---|---|---|
| | 1 | 2 | 3 | 4 | 5 | 6 | 7 | 8 |
| {BW, CB} | {0, 0} | {1, 1} | {2, 0} | {2, 1} | {3, 0} | {3, 1} | {0, 1} | {1, 0} |

Implementation 9:

In this embodiment, a secondary 40 MHz channel is divided into two 20 MHz channels. The two 20 MHz channels may be classified according to different rules. For example, the two 20 MHz channels are classified into an upper 20 MHz channel (a 20 MHz channel having a higher frequency) and a lower 20 MHz channel (a 20 MHz channel having a lower frequency) according to frequencies. For another example, the two 20 MHz channels are classified into a near 20 MHz channel and a far 20 MHz channel according to distances to the primary 20 MHz channel. A classification rule is not limited in this patent solution, and an indication principle thereof is similar. For convenience, an example of the upper 20 MHz channel and the lower 20 MHz channel is used in descriptions of subsequent embodiments for description. In the implementation 9, there are following six bandwidth modes shown in FIG. 19:

Mode 1: a primary 20 MHz channel.

Mode 2: a primary 20 MHz channel and a secondary 20 MHz channel.

Mode 3: a primary 20 MHz channel and a secondary 40 MHz channel; or a primary 20 MHz channel and a 20 MHz channel of a secondary 40 MHz channel.

Specifically, when the primary 20 MHz channel is on a channel, which is numbered by using an odd number, in descending order of frequencies, the 20 MHz channel is a 20 MHz channel, which is numbered by using an even number, of the secondary 40 MHz channel. When the primary 20 MHz channel is on a channel, which is numbered by using an even number, in descending order of frequencies, the 20 MHz channel is a 20 MHz channel, which is numbered by using an odd number, of the secondary 40 MHz channel.

Mode 4: a primary 20 MHz channel, a secondary 20 MHz channel, and a lower 20 MHz channel of secondary 40 MHz channel; or a primary 20 MHz channel, a secondary 20 MHz channel, and an upper 20 MHz channel of secondary 40 MHz channel; or a primary 20 MHz channel, a secondary 20 MHz channel, and a secondary 40 MHz channel.

Mode 5: a primary 20 MHz channel and a secondary 80 MHz channel; or a primary 20 MHz channel, a lower 20 MHz channel of secondary 40 MHz channel, and a secondary 80 MHz channel; or a primary 20 MHz channel, an upper 20 MHz channel of secondary 40 MHz channel, and a secondary 80 MHz channel; or a primary 20 MHz channel, a secondary 40 MHz channel, and a secondary 80 MHz channel.

Mode 6: a primary 20 MHz channel, a secondary 20 MHz channel, and a secondary 80 MHz channel; or a primary 20 MHz channel, a secondary 20 MHz channel, a lower 20 MHz channel of secondary 40 MHz channel, and a secondary 80 MHz; or a primary 20 MHz channel, a secondary 20 MHz channel, an upper 20 MHz channel of secondary 40 MHz channel, and a secondary 80 MHz channel; or a primary 20 MHz channel, a secondary 20 MHz channel, a secondary 40 MHz channel, and a secondary 80 MHz channel.

For the indication manners in the six modes, indication is performed by using both a BW field (two bits) and a CB field (one bit). {BW, CB} has eight indication manners in total: {0, 0}, {0, 1}, {1, 0}, {1, 1}, {2, 0}, {2, 1}, {3, 0}, and {3, 1}, as shown in Table 6. In principle, for each channel mode, one or more indication manners may be randomly selected from the eight indication manners without repetition. A corresponding manner shown in Table 6 is described in this embodiment. Another manner of corresponding between an indication manner and a channel mode is also applicable to this embodiment.

TABLE 6

| | Mode | | | | | |
|---|---|---|---|---|---|---|
| | 1 | 2 | 3 | 4 | 5 | 6 |
| {BW, auxiliary indication} | {0, 0} or {0, 1} | {1, 0} or {1, 1} | {2, 0} | {2, 1} | {3, 0} | {3, 1} |

Implementation 10:

In this embodiment, a secondary 40 MHz channel is divided into two 20 MHz channels, and a secondary 80 MHz channel is divided into two continuous 40 MHz channels. For convenience, an example in which the two 20 MHz channels and the two 40 MHz channels that are obtained after division are respectively an upper 20 MHz channel, a lower 20 MHz channel, an upper 40 MHz channel, and a lower 40 MHz channel is used in descriptions of subsequent embodiments for description.

In the implementation 10, there are following six bandwidth modes shown in FIG. 20a:

Mode 1: a primary 20 MHz channel.

Mode 2: a primary 20 MHz channel and a secondary 20 MHz channel.

Mode 3: a primary 20 MHz channel and a secondary 40 MHz channel; or a primary 20 MHz channel and a 20 MHz channel of a secondary 40 MHz channel. Specifically, when the primary 20 MHz channel is on a channel, which is numbered by using an odd number, in descending order of frequencies, the 20 MHz channel is a 20 MHz channel, which is numbered by using an even number, of the secondary 40 MHz channel. When the primary 20 MHz channel is on a channel, which is numbered by using an even number, in descending order of frequencies, the 20 MHz channel is a 20 MHz channel, which is numbered by using an odd number, of the secondary 40 MHz channel.

Mode 4: a primary 20 MHz channel, a secondary 20 MHz channel, and a lower 20 MHz channel of secondary 40 MHz channel; or a primary 20 MHz channel, a secondary 20 MHz channel, and an upper 20 MHz channel of secondary 40 MHz channel; or a primary 20 MHz channel, a secondary 20 MHz channel, and a secondary 40 MHz channel.

Mode 5: a primary 20 MHz channel and a lower 40 MHz channel of secondary 80 MHz channel; or a primary 20 MHz channel, an upper 20 MHz channel of secondary 40 MHz channel, and a lower 40 MHz channel of secondary 80 MHz channel; or a primary 20 MHz channel, a lower 20 MHz channel of secondary 40 MHz channel, and a lower 40 MHz channel of secondary 80 MHz channel; or a primary 20 MHz channel and a secondary 80 MHz channel; or a primary 20 MHz channel, a secondary 40 MHz channel, and a lower 40 MHz channel of secondary 80 MHz channel; or a primary 20 MHz channel, an upper 20 MHz channel of secondary 40 MHz channel, and a secondary 80 MHz channel; or a primary 20 MHz channel, a lower 20 MHz channel of secondary 40 MHz channel, and a secondary 80 MHz channel; or a primary 20 MHz channel, a secondary 40 MHz channel, and a secondary 80 MHz channel.

Mode 6: a primary 20 MHz channel, a secondary 20 MHz channel, and a lower 40 MHz channel of secondary 80 MHz channel; or a primary 20 MHz channel, a secondary 20 MHz channel, an upper 20 MHz channel of secondary 40 MHz channel, and a lower 40 MHz channel of secondary 80 MHz channel; or a primary 20 MHz channel, a secondary 20 MHz channel, a lower 20 MHz channel of secondary 40 MHz channel, and a lower 40 MHz channel of secondary 80 MHz channel; or a primary 20 MHz channel, a secondary 20 MHz channel, and a secondary 80 MHz channel; or a primary 20 MHz channel, a secondary 20 MHz channel, a secondary 40 MHz channel, and a lower 40 MHz channel of secondary 80 MHz channel; or a primary 20 MHz channel, a secondary 20 MHz channel, an upper 20 MHz channel of secondary 40 MHz channel, and a secondary 80 MHz channel; or a primary 20 MHz channel, a secondary 20 MHz channel, a lower 20 MHz channel of secondary 40 MHz channel, and a secondary 80 MHz channel; or a primary 20 MHz channel, a secondary 20 MHz channel, a secondary 40 MHz channel, and a secondary 80 MHz channel; or a primary 20 MHz channel, a secondary 20 MHz channel, and an upper 40 MHz channel of secondary 80 MHz channel; or a primary 20 MHz channel, a secondary 20 MHz channel, an upper 20 MHz channel of secondary 40 MHz channel, and an upper 40 MHz channel of secondary 80 MHz channel; or a primary 20 MHz channel, a secondary 20 MHz channel, a lower 20 MHz channel of secondary 40 MHz channel, and an upper 40 MHz channel of secondary 80 MHz channel; or a primary 20 MHz channel, a secondary 20 MHz channel, a secondary 40 MHz channel, and an upper 40 MHz channel of secondary 80 MHz channel.

For the indication manners in the six modes, indication is performed by using both a BW field (two bits) and a CB field (one bit). {BW, CB} has eight indication manners in total: {0, 0}, {0, 1}, {1, 0}, {1, 1}, {2, 0}, {2, 1}, {3, 0}, and {3, 1}, as shown in Table 7. In principle, for each channel mode, one or more indication manners may be randomly selected from the eight indication manners without repetition. A corresponding manner shown in Table 7 is described in this embodiment. Another manner of corresponding between an indication manner and a channel mode is also applicable to this embodiment.

TABLE 7

| | Mode | | | | | |
|---|---|---|---|---|---|---|
| | 1 | 2 | 3 | 4 | 5 | 6 |
| {BW, CB} | {0, 0} or {0, 1} | {1, 0} or {1, 1} | {2, 0} | {2, 1} | {3, 0} | {3, 1} |

FIG. 20b shows another implementation, and the implementation includes the following six channel modes:

Mode 1: a primary 20 MHz channel.

Mode 2: a primary 20 MHz channel and a secondary 20 MHz channel.

Mode 3: a primary 20 MHz channel and a secondary 40 MHz channel; or a primary 20 MHz channel and a 20 MHz channel of a secondary 40 MHz channel.

Specifically, when the primary 20 MHz channel is on a channel, which is numbered by using an odd number, in descending order of frequencies, the 20 MHz channel is a 20 MHz channel, which is numbered by using an even number, of the secondary 40 MHz channel. When the primary 20 MHz channel is on a channel, which is numbered by using an even number, in descending order of frequencies, the 20 MHz channel is a 20 MHz channel, which is numbered by using an odd number, of the secondary 40 MHz channel.

Mode 4: a primary 20 MHz channel, a secondary 20 MHz channel, and a lower 20 MHz channel of secondary 40 MHz channel; or a primary 20 MHz channel, a secondary 20 MHz channel, and an upper 20 MHz channel of secondary 40 MHz channel; or a primary 20 MHz channel, a secondary 20 MHz channel, and a secondary 40 MHz channel.

Mode 5: a primary 20 MHz channel and an upper 40 MHz channel of secondary 80 MHz channel; or a primary 20 MHz channel, an upper 20 MHz channel of secondary 40 MHz channel, and an upper 40 MHz channel of secondary 80 MHz channel; or a primary 20 MHz channel, a lower 20 MHz channel of secondary 40 MHz channel, and an upper 40 MHz channel of secondary 80 MHz channel; or a primary 20 MHz channel and a secondary 80 MHz channel; or a primary 20 MHz channel, a secondary 40 MHz channel, and an upper 40 MHz channel of secondary 80 MHz channel; or a primary 20 MHz channel, an upper 20 MHz channel of secondary 40 MHz channel, and a secondary 80 MHz channel; or a primary 20 MHz channel, a lower 20 MHz channel of secondary 40 MHz channel, and a secondary 80 MHz channel; or a primary 20 MHz channel, a secondary 40 MHz channel, and a secondary 80 MHz channel.

Mode 6: a primary 20 MHz channel, a secondary 20 MHz channel, and a lower 40 MHz channel of secondary 80 MHz channel; or a primary 20 MHz channel, a secondary 20 MHz channel, an upper 20 MHz channel of secondary 40 MHz channel, and a lower 40 MHz channel of secondary 80 MHz channel; or a primary 20 MHz channel, a secondary 20 MHz channel, a lower 20 MHz channel of secondary 40 MHz channel, and a lower 40 MHz channel of secondary 80 MHz channel; or a primary 20 MHz channel, a secondary 20 MHz channel, and a secondary 80 MHz channel; or a primary 20 MHz channel, a secondary 20 MHz channel, and a lower 40 MHz channel of secondary 80 MHz channel; or a primary 20 MHz channel, a secondary 20 MHz channel, an upper 20 MHz channel of secondary 40 MHz channel, and a secondary 80 MHz channel; or a primary 20 MHz channel, a secondary 20 MHz channel, a lower 20 MHz channel of secondary 40 MHz channel, and a secondary 80 MHz channel; or a primary 20 MHz channel, a secondary 20 MHz channel, a secondary 40 MHz channel, and a secondary 80 MHz channel; or a primary 20 MHz channel, a secondary 20 MHz channel, and an upper 40 MHz channel of secondary 80 MHz channel; or a primary 20 MHz channel, a secondary 20 MHz channel, an upper 20 MHz channel of secondary 40 MHz channel, and an upper 40 MHz channel of secondary 80 MHz channel; or a primary 20 MHz channel, a secondary 20 MHz channel, a lower 20 MHz channel of secondary 40 MHz channel, and an upper 40 MHz channel of secondary 80 MHz channel; or a primary 20 MHz channel, a secondary 20 MHz channel, a secondary 40 MHz channel, and an upper 40 MHz channel of secondary 80 MHz channel.

For the indication manners in the six modes, indication is performed by using both a BW field (two bits) and a CB field (one bit). {BW, CB} has eight indication manners in total: {0, 0}, {0, 1}, {1, 0}, {1, 1}, {2, 0}, {2, 1}, {3, 0}, and {3, 1}, as shown in Table 8. In principle, for each channel mode, one or more indication manners may be randomly selected from the eight indication manners without repetition. A corresponding manner shown in Table 8 is described in this embodiment. Another manner of corresponding between an indication manner and a channel mode is also applicable to this embodiment.

TABLE 8

| | Mode | | | | | |
|---|---|---|---|---|---|---|
| | 1 | 2 | 3 | 4 | 5 | 6 |
| {BW, CB} | {0, 0} or {0, 1} | {1, 0} or {1, 1} | {2, 0} | {2, 1} | {3, 0} | {3, 1} |

FIG. 20c shows another implementation, and the implementation includes the following seven channel modes:

Mode 1: a primary 20 MHz channel.

Mode 2: a primary 20 MHz channel and a secondary 20 MHz channel.

Mode 3: a primary 20 MHz channel and a secondary 40 MHz channel; or a primary 20 MHz channel and a 20 MHz channel of a secondary 40 MHz channel. Specifically, when the primary 20 MHz channel is on a channel, which is numbered by using an odd number, in descending order of frequencies, the 20 MHz channel is a 20 MHz channel, which is numbered by using an even number, of the secondary 40 MHz channel. When the primary 20 MHz channel is on a channel, which is numbered by using an even number, in descending order of frequencies, the 20 MHz channel is a 20 MHz channel, which is numbered by using an odd number, of the secondary 40 MHz channel.

Mode 4: a primary 20 MHz channel, a secondary 20 MHz channel, and a lower 20 MHz channel of secondary 40 MHz channel; or a primary 20 MHz channel, a secondary 20 MHz channel, and an upper 20 MHz channel of secondary 40 MHz channel; or a primary 20 MHz channel, a secondary 20 MHz channel, and a secondary 40 MHz channel.

Mode 5: a primary 20 MHz channel and a lower 40 MHz channel of secondary 80 MHz channel; or a primary 20 MHz channel, an upper 20 MHz channel of secondary 40 MHz channel, and a lower 40 MHz channel of secondary 80 MHz channel; or a primary 20 MHz channel, a lower 20 MHz channel of secondary 40 MHz channel, and a lower 40 MHz channel of secondary 80 MHz channel; or a primary 20 MHz channel and a secondary 80 MHz channel; or a primary 20 MHz channel, a secondary 40 MHz channel, and a lower 40 MHz channel of secondary 80 MHz channel; or a primary 20 MHz channel, an upper 20 MHz channel of secondary 40 MHz channel, and a secondary 80 MHz channel; or a primary 20 MHz channel, a lower 20 MHz channel of secondary 40 MHz channel, and a secondary 80 MHz channel; or a primary 20 MHz channel, a secondary 40 MHz channel, and a secondary 80 MHz channel.

Mode 6: a primary 20 MHz channel, a secondary 20 MHz channel, and a lower 40 MHz channel of secondary 80 MHz channel; or a primary 20 MHz channel, a secondary 20 MHz channel, an upper 20 MHz channel of secondary 40 MHz channel, and a lower 40 MHz channel of secondary 80 MHz channel; or a primary 20 MHz channel, a secondary 20 MHz channel, a lower 20 MHz channel of secondary 40 MHz channel, and a lower 40 MHz channel of secondary 80 MHz channel; or a primary 20 MHz channel, a secondary 20 MHz channel, and a secondary 80 MHz channel; or a primary 20 MHz channel, a secondary 20 MHz channel, a secondary 40 MHz channel, and a lower 40 MHz channel of secondary 80 MHz channel; or a primary 20 MHz channel, a secondary 20 MHz channel, an upper 20 MHz channel of secondary 40 MHz channel, and a secondary 80 MHz channel; or a primary 20 MHz channel, a secondary 20 MHz channel, a lower 20 MHz channel of secondary 40 MHz channel, and a secondary 80 MHz channel; or a primary 20 MHz channel, a secondary 20 MHz channel, and an upper 40 MHz channel of secondary 80 MHz channel; or a primary 20 MHz channel, a secondary 20 MHz channel, an upper 20 MHz channel of secondary 40 MHz channel, and an upper 40 MHz channel of secondary 80 MHz channel; or a primary 20 MHz channel, a secondary 20 MHz channel, a lower 20 MHz channel of secondary 40 MHz channel, and an upper 40 MHz channel of secondary 80 MHz channel; or a primary 20 MHz channel, a secondary 20 MHz channel, a secondary 40 MHz channel, and an upper 40 MHz channel of secondary 80 MHz channel.

Mode 7: a primary 20 MHz channel and an upper 40 MHz channel of secondary 80 MHz channel; or a primary 20 MHz channel, an upper 20 MHz channel of secondary 40 MHz channel, and an upper 40 MHz channel of secondary 80 MHz channel; or a primary 20 MHz channel, a lower 20 MHz channel of secondary 40 MHz channel, and an upper 40 MHz channel of secondary 80 MHz channel; or a primary 20 MHz channel, a secondary 40 MHz channel, and an upper 40 MHz channel of secondary 80 MHz channel.

For the indication manners in the seven modes, indication is performed by using both a BW field (two bits) and a CB field (one bit). {BW, CB} has eight indication manners in total: {0, 0}, {0, 1}, {1, 0}, {1, 1}, {2, 0}, {2, 1}, {3, 0}, and {3, 1}, as shown in Table 9. In principle, for each channel mode, one or more indication manners may be randomly selected from the eight indication manners without repetition. A corresponding manner shown in Table 9 is described in this embodiment. Another manner of corresponding between an indication manner and a channel mode is also applicable to this embodiment.

TABLE 9

| | Mode | | | | | | |
|---|---|---|---|---|---|---|---|
| | 1 | 2 | 3 | 4 | 5 | 6 | 7 |
| {BW, CB} | {0, 0} | {1, 0} or {1, 1} | {2, 0} | {2, 1} | {3, 0} | {3, 1} | {0, 1} |

FIG. 20d shows another implementation, and the implementation includes the following eight channel modes:

Mode 1: a primary 20 MHz channel.

Mode 2: a primary 20 MHz channel and a secondary 20 MHz channel.

Mode 3: a primary 20 MHz channel and a secondary 40 MHz channel; or a primary 20 MHz channel and a 20 MHz channel of a secondary 40 MHz channel.

Specifically, when the primary 20 MHz channel is on a channel, which is numbered by using an odd number, in descending order of frequencies, the 20 MHz channel is a 20 MHz channel, which is numbered by using an even number, of the secondary 40 MHz channel. When the primary 20 MHz channel is on a channel, which is numbered by using an even number, in descending order of frequencies, the 20 MHz channel is a 20 MHz channel, which is numbered by using an odd number, of the secondary 40 MHz channel.

Mode 4: a primary 20 MHz channel, a secondary 20 MHz channel, and a lower 20 MHz channel of secondary 40 MHz channel; or a primary 20 MHz channel, a secondary 20 MHz channel, and an upper 20 MHz channel of secondary 40 MHz channel; or a primary 20 MHz channel, a secondary 20 MHz channel, and a secondary 40 MHz channel.

Mode 5: a primary 20 MHz channel and a lower 40 MHz channel of secondary 80 MHz channel; or a primary 20 MHz channel, an upper 20 MHz channel of secondary 40 MHz channel, and a lower 40 MHz channel of secondary 80 MHz channel; or a primary 20 MHz channel, a lower 20 MHz channel of secondary 40 MHz channel, and a lower 40 MHz channel of secondary 80 MHz channel; or a primary 20 MHz channel and a secondary 80 MHz channel; or a primary 20 MHz channel, a secondary 40 MHz channel, and a lower 40 MHz channel of secondary 80 MHz channel; or a primary 20 MHz channel, an upper 20 MHz channel of secondary 40 MHz channel, and a secondary 80 MHz channel; or a primary 20 MHz channel, a lower 20 MHz channel of secondary 40 MHz channel, and a secondary 80 MHz channel; or a primary 20 MHz channel, a secondary 40 MHz channel, and a secondary 80 MHz channel.

Mode 6: a primary 20 MHz channel, a secondary 20 MHz channel, and a lower 40 MHz channel of secondary 80 MHz channel; or a primary 20 MHz channel, a secondary 20 MHz channel, an upper 20 MHz channel of secondary 40 MHz channel, and a lower 40 MHz channel of secondary 80 MHz channel; or a primary 20 MHz channel, a secondary 20 MHz channel, a lower 20 MHz channel of secondary 40 MHz channel, and a lower 40 MHz channel of secondary 80 MHz channel; or a primary 20 MHz channel, a secondary 20 MHz channel, and a secondary 80 MHz channel; or a primary 20 MHz channel, a secondary 20 MHz channel, a secondary 40 MHz channel, and a lower 40 MHz channel of secondary 80 MHz channel; or a primary 20 MHz channel, a secondary 20 MHz channel, an upper 20 MHz channel of secondary 40 MHz channel, and a secondary 80 MHz channel; or a primary 20 MHz channel, a secondary 20 MHz channel, a lower 20 MHz channel of secondary 40 MHz channel, and a secondary 80 MHz channel; or a primary 20 MHz channel, a secondary 20 MHz channel, a secondary 40 MHz channel, and a secondary 80 MHz channel; or a primary 20 MHz channel, a secondary 20 MHz channel, and an upper 40 MHz channel of secondary 80 MHz channel; or a primary 20 MHz channel, a secondary 20 MHz channel, an upper 20 MHz channel of secondary 40 MHz channel, and an upper 40 MHz channel of secondary 80 MHz channel; or a primary 20 MHz channel, a secondary 20 MHz channel, a lower 20 MHz channel of secondary 40 MHz channel, and an upper 40 MHz channel of secondary 80 MHz channel; or a primary 20 MHz channel, a secondary 20 MHz channel, a secondary 40 MHz channel, and an upper 40 MHz channel of secondary 80 MHz channel.

Mode 7: a primary 20 MHz channel and an upper 40 MHz channel of secondary 80 MHz channel; or a primary 20 MHz channel, an upper 20 MHz channel of secondary 40 MHz channel, and an upper 40 MHz channel of secondary 80 MHz channel; or a primary 20 MHz channel, a lower 20 MHz channel of secondary 40 MHz channel, and an upper 40 MHz channel of secondary 80 MHz channel; or a primary 20 MHz channel, a lower 20 MHz channel of secondary 40 MHz channel, and an upper 40 MHz channel of secondary 80 MHz channel.

Mode 8: a primary 20 MHz channel and a 20 MHz channel of a secondary 40 MHz channel. Specifically, when the primary 20 MHz channel is on a channel, which is numbered by using an odd number, in descending order of frequencies, the 20 MHz channel is a 20 MHz channel, which is numbered by using an odd number, of the secondary 40 MHz channel. When the primary 20 MHz channel is on a channel, which is numbered by using an even number, in descending order of frequencies, the 20 MHz channel is a 20 MHz channel, which is numbered by using an even number, of the secondary 40 MHz channel.

For the indication manners in the eight modes, indication is performed by using both a BW field (two bits) and a CB field (one bit). {BW, CB} has eight indication manners in total: {0, 0}, {0,1}, {1, 0}, {1,1}, {2, 0}, {2,1}, {3, 0}, and {3,1}, as shown in Table 10. In principle, for each channel mode, one or more indication manners may be randomly selected from the eight indication manners without repetition. A corresponding manner shown in Table 10 is described in this embodiment. Another manner of corresponding between an indication manner and a channel mode is also applicable to this embodiment.

TABLE 10

|  | Mode | | | | | | | |
| --- | --- | --- | --- | --- | --- | --- | --- | --- |
|  | 1 | 2 | 3 | 4 | 5 | 6 | 7 | 8 |
| {BW, CB} | {0, 0} | {1, 1} | {2, 0} | {2, 1} | {3, 0} | {3, 1} | {0, 1} | {1, 0} |

This embodiment of the present invention provides a method for indicating a channel in a wireless local area network WLAN. A sending station generates and sends a physical protocol data unit PPDU, the PPDU includes a preamble field and a data field, a high efficiency signal field HE-SIG-A of the preamble field includes a bandwidth identifier and a channel bonding identifier, and the channel bonding identifier is used to indicate whether a data transmission channel is continuous in a frequency domain. In the foregoing manner, a discontinuous channel in a frequency domain in a wireless local area network is indicated, an available data transmission channel is improved, and a system throughput is increased.

Embodiment 2

Embodiment 2 of the present invention provides a method, which is applied to a WLAN, for indicating a channel. The method may be applied to a station, for example, the AP and the STA 1 to the STA 3 in FIG. 2. The station may support a next-generation WLAN standard, for example, the 802.11ax standard. FIG. 21 is an example block diagram of the method for indicating a channel. Specific steps are as follows:

Step 201: Generate a physical protocol data unit PPDU, where the PPDU includes a preamble field and a data field, a high efficiency signal field HE-SIG-A of the preamble field includes a bandwidth identifier and a secondary 20 MHz channel identifier, and when the bandwidth identifier indicates that a bandwidth of a data transmission channel is greater than 40 MHz, the secondary 20 MHz channel identifier is used to indicate whether a secondary 20 MHz channel is available.

Step 202: Send the PPDU.

Specifically, the secondary 20 MHz channel identifier includes at least one bit, and one bit is used as an example below for description. If the secondary 20 MHz channel identifier is a first value, the secondary 20 MHz channel is unavailable; or if the secondary 20 MHz channel identifier is a second value, the secondary 20 MHz channel is available.

It should be noted that the first value and the second value of the secondary 20 MHz channel identifier are not limited in the present invention. The first value is "0" and the second value is "1". The first value is "1" and the second value is "0". The foregoing two cases are both in the protection scope of the present invention. For convenience of description, the case in which the first value is "0" and the second value is "1" is specifically used below for description.

Specifically, the sending station indicates the data transmission channel by using the bandwidth identifier and the secondary 20 MHz channel identifier.

If the bandwidth identifier is a first value, the data transmission channel includes a primary 20 MHz channel;

if the bandwidth identifier is a second value, the data transmission channel includes a primary 20 MHz channel and a secondary 20 MHz channel;

if the bandwidth identifier is a third value, and the secondary 20 MHz channel identifier is the first value, the data transmission channel includes a primary 20 MHz channel and a secondary 40 MHz channel;

if the bandwidth identifier is a third value, and the secondary 20 MHz channel identifier is the second value, the data transmission channel includes a primary 20 MHz channel, a secondary 20 MHz channel, and a secondary 40 MHz channel;

if the bandwidth identifier is a fourth value and the secondary 20 MHz channel identifier is the first value, the data transmission channel is 160 MHz or (80+80) MHz, and the data transmission channel does not include a secondary 20 MHz channel, that is, includes a primary 20 MHz channel and a secondary 80 MHz channel, or includes a primary 20 MHz channel, a secondary 40 MHz channel, and a secondary 80 MHz channel; or if the bandwidth identifier is a fourth value and the secondary 20 MHz channel identifier is the second value, a bandwidth of the data transmission channel is 160 MHz or (80+80) MHz, and the data transmission channel includes a secondary 20 MHz channel, that is, includes a primary 20 MHz channel, a secondary 20 MHz channel, and a secondary 80 MHz channel, or includes a primary 20 MHz channel, a secondary 20 MHz channel, a secondary 40 MHz channel, and a secondary 80 MHz channel.

It should be noted that the bandwidth identifier includes at least two bits and the secondary 20 MHz channel identifier includes at least one bit. For convenience of description, an example in which the bandwidth identifier includes two bits and the secondary 20 MHz channel identifier includes one bit is used for description in this embodiment.

It should be noted that definitions of the first value to the fourth value of the bandwidth identifier are already described in Embodiment 1, and the definitions are also applicable to subsequent implementations.

With reference to FIG. 22, a mapping relationship between the secondary 20 MHz channel identifier and the bandwidth identifier, and the channel is described.

When BW=00, a data transmission bandwidth channel is a primary 20 MHz channel, that is, a channel 0. When the data transmission bandwidth is less than or equal to 40 MHz, a value of a channel bonding identifier may be 0, 1, or reserved.

When BW=01, the data transmission channel includes a primary 20 MHz channel and a secondary 20 MHz channel, that is, the channel 0 and a channel 1. When the data transmission bandwidth is less than or equal to 40 MHz, the value of the channel bonding identifier may be 0, 1, or reserved.

When BW=10 and the secondary 20 MHz channel identifier=0, the data transmission channel includes a primary 20 MHz channel and a secondary 40 MHz channel, that is, the channel 0, a channel 2, and a channel 3.

When BW=10 and the secondary 20 MHz channel identifier=1, the data transmission channel includes a primary 20 MHz channel, a secondary 20 MHz channel, and a secondary 40 MHz channel, that is, the channels 0 to 3.

When BW=11 and the secondary 20 MHz channel identifier=0, the data transmission channel includes a primary 20 MHz channel and a secondary 80 MHz channel, that is, the channel 0 and channels 4 to 7. Alternatively, the data transmission channel includes a primary 20 MHz channel, a secondary 40 MHz channel, and a secondary 80 MHz channel, that is, the channels 0 and 2 to 7.

When BW=11 and the secondary 20 MHz channel identifier=1, the data transmission channel includes a primary 20 MHz channel, a secondary 20 MHz channel, a secondary 40 MHz channel, and a secondary 80 MHz channel, that is, the channels 0 to 7. Alternatively, the data transmission channel includes a primary 20 MHz channel, a secondary 20 MHz channel, and a secondary 80 MHz channel, that is, the channels 0, 1, and 4 to 7.

This embodiment of the present invention provides a method for indicating a channel in a wireless local area network WLAN. A sending station generates and sends a physical protocol data unit PPDU, the PPDU includes a preamble field and a data field, a high efficiency signal field HE-SIG-A of the preamble field includes a bandwidth identifier and a secondary 20 MHz channel identifier, and when the bandwidth identifier indicates that a data transmission channel is greater than 40 MHz, the secondary 20 MHz channel identifier is used to indicate whether a secondary 20 MHz channel is available. In the foregoing manner, a discontinuous channel in a frequency domain in a wireless local area network is indicated, an available data transmission channel is improved, and a system throughput is increased.

Embodiment 3

Embodiment 3 of the present invention provides a method, which is applied to a WLAN, for indicating a channel. The method may be applied to a station, for example, the AP and the STA 1 to the STA 3 in FIG. 2. The station may support a next-generation WLAN standard, for example, the 802.11ax standard.

In this embodiment, a data transmission channel is indicated by using a bandwidth identifier in a PPDU, and the bandwidth (BW) identifier includes at least two bits.

With reference to FIG. 23, a mapping relationship between the bandwidth identifier and the channel is described.

When BW=00, it indicates that a current data transmission channel includes a primary 20 MHz channel.

When BW=01, it indicates that the current data transmission channel includes a primary 20 MHz channel and a secondary 20 MHz channel.

When BW=10, it indicates that the current data transmission channel includes a primary 20 MHz channel and a secondary 40 MHz channel; or includes a primary 20 MHz channel, a secondary 20 MHz channel, and a secondary 40 MHz channel.

When BW=11, it indicates that a current data transmission channel includes a primary 20 MHz channel and a secondary 80 MHz channel; or includes a primary 20 MHz channel, a secondary 20 MHz channel, and a secondary 80 MHz channel; or includes a primary 20 MHz channel, a secondary 40 MHz channel, and a secondary 80 MHz channel; or includes a primary 20 MHz channel, a secondary 20 MHz channel, a secondary 40 MHz channel, and a secondary 80 MHz channel.

When BW=2, either of an HE-SIG-B 1 and an HE-SIG-B 2 may be obtained by using a primary 20 MHz channel, and the other part of an HE-SIG-B is obtained by using a 20

MHz channel of secondary 40 MHz. When specific frequencies are arranged in descending order, when the primary 20 MHz channel is on a 20 MHz channel that is numbered by using an odd number, the other part of the HE-SIG-B may be obtained by using a 20 MHz channel, which is numbered by using an even number, of the secondary 40 MHz channel. In contrast, when the primary 20 MHz channel is on a 20 MHz channel that is numbered by using an even number, the other part of the HE-SIG-B may be obtained by using a 20 MHz channel, which is numbered by using an odd number, of the secondary 40 MHz channel.

When BW=3, either of an HE-SIG-B 1 and an HE-SIG-B 2 may be obtained by using a primary 20 MHz channel, and the other part of an HE-SIG-B is obtained by using a 20 MHz channel of secondary 80 MHz. When specific frequencies are arranged in descending order, when the primary 20 MHz channel is on a 20 MHz channel that is numbered by using an odd number, the other part of the HE-SIG-B may be obtained by using any 20 MHz channel, which is numbered by using an even number, of the secondary 80 MHz channel. In contrast, when the primary 20 MHz channel is on a 20 MHz channel that is numbered by using an even number, the other part of the HE-SIG-B may be obtained by using any 20 MHz channel, which is numbered by using an odd number, of the secondary 80 MHz channel.

This embodiment of the present invention provides a method for indicating a channel in a wireless local area network WLAN. A sending station generates and sends a physical protocol data unit PPDU, the PPDU includes a preamble field and a data field, and a high efficiency signal field HE-SIG-A of the preamble field includes a bandwidth identifier. In the foregoing manner, a discontinuous channel in a frequency domain in a wireless local area network is indicated, an available data transmission channel is improved, and a system throughput is increased.

Embodiment 4

Figures 24, 25:
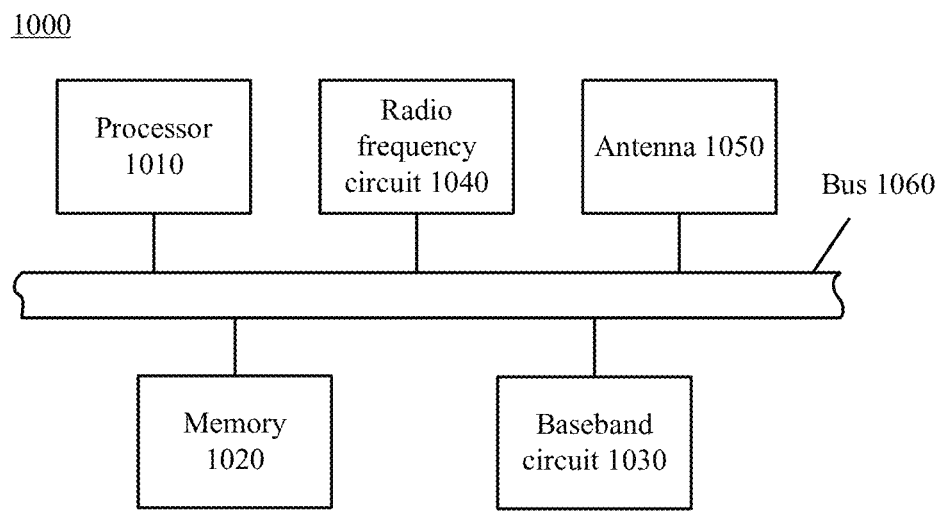
FIG. 24 is a diagram of an apparatus according to Embodiment 4 of the present invention.
FIG. 25 is a channel indication diagram according to Embodiment 7 of the present invention.

Referring to FIG. 24, FIG. 24 is a schematic block diagram of an apparatus for indicating a channel in a wireless local area network according to Embodiment 4 of the present invention. The apparatus is, for example, an access point, or a dedicated circuit or a chip implementing a related function. The access point 1000 includes a processor 1010, a memory 1020, a baseband circuit 1030, a radio frequency circuit 1040, and an antenna 1050. The apparatus may be the AP shown in FIG. 2. The AP communicates with a STA 1, a STA 2, and a STA 3.

Specifically, the processor 1010 controls operations of the access point 1000. The memory 1020 may include a read-only memory and a random access memory, and provide instructions and data to the processor 1010. The processor may be a general purpose processor, a digital signal processor, an application-specific integrated circuit, a field programmable gate array, or another programmable logic device. A part of the memory 1020 may further include a non-volatile random access memory (NVRAM). The baseband circuit 1030 is configured to generate a to-be-transmitted baseband signal, or to decode a received baseband signal. The radio frequency circuit 1040 is configured to modulate a low-frequency baseband signal to a high-frequency carrier signal, and the high-frequency carrier signal is transmitted by using the antenna 1050. The radio frequency circuit is also configured to demodulate a high-frequency signal received by the antenna 1050 to a low-frequency carrier signal. The components of the access point 1000 are coupled together by using a bus system 1060. In addition to a data bus, the bus system 1060 includes a power bus, a control bus, and a status signal bus. However, for clear description, various buses in the figure are marked as the bus system 1060. It should be noted that the foregoing descriptions of the access point structure may be applied to subsequent embodiments.

The baseband circuit 1030 is configured to generate a physical protocol data unit PPDU, where the PPDU includes a preamble field and a data field, a high efficiency signal field HE-SIG-A of the preamble field includes a bandwidth identifier and a channel bonding identifier, and the channel bonding identifier is used to indicate whether a data transmission channel is continuous in a frequency domain.

The radio frequency circuit 1040 is configured to send the PPDU.

Specifically, if the channel bonding identifier is a first value, the data transmission channel is continuous in the frequency domain; or if the channel bonding identifier is a second value, the data transmission channel includes multiple discontinuous channels in the frequency domain.

Optionally, the apparatus for indicating a channel indicates the data transmission channel by using both the bandwidth identifier and the channel bonding identifier, and indication manners are specifically as follows:

Manner 1:

If the channel bonding identifier is the first value, and the bandwidth identifier is a first value, the data transmission channel includes a primary 20 MHz channel;

if the channel bonding identifier is the first value, and the bandwidth identifier is a second value, the data transmission channel includes a primary 20 MHz channel and a secondary 20 MHz channel;

if the channel bonding identifier is the first value, and the bandwidth identifier is a third value, the data transmission channel includes a primary 20 MHz channel, a secondary 20 MHz channel, and a secondary 40 MHz channel;

if the channel bonding identifier is the first value, and the bandwidth identifier is a fourth value, the data transmission channel includes a primary 20 MHz channel, a secondary 20 MHz channel, a secondary 40 MHz channel, and a secondary 80 MHz channel;

if the channel bonding identifier is the second value, and the bandwidth identifier is a first value, the data transmission channel includes primary 20 MHz and a secondary 40 MHz channel;

if the channel bonding identifier is the second value, and the bandwidth identifier is a second value, the data transmission channel includes a primary 20 MHz channel and a secondary 80 MHz channel;

if the channel bonding identifier is the second value, and the bandwidth identifier is a third value, the data transmission channel includes a primary 20 MHz channel, a secondary 20 MHz channel, and a secondary 80 MHz channel; or if the channel bonding identifier is the second value, and the bandwidth identifier is a fourth value, the data transmission channel includes a primary 20 MHz channel, a secondary 40 MHz channel, and a secondary 80 MHz channel.

Manner 2:

If the bandwidth identifier is a first value, the data transmission channel includes a primary 20 MHz channel;

if the bandwidth identifier is a second value, the data transmission channel includes a primary 20 MHz channel and a secondary 20 MHz channel;

if the bandwidth identifier is a third value, and the channel bonding identifier is the first value, the data transmission channel includes a primary 20 MHz channel, a secondary 20 MHz channel, and a secondary 40 MHz channel;

if the bandwidth identifier is a third value, and the channel bonding identifier is the second value, the data transmission channel includes a primary 20 MHz channel and a secondary 40 MHz channel;

if the bandwidth identifier is a fourth value, and the channel bonding identifier is the first value, the data transmission channel includes a primary 20 MHz channel, a secondary 20 MHz channel, a secondary 40 MHz channel, and a secondary 80 MHz channel; or if the bandwidth identifier is a fourth value, and the channel bonding identifier is the second value, the data transmission channel includes a primary 20 MHz channel, a secondary 40 MHz channel, and a secondary 80 MHz channel.

Manner 3:

If the bandwidth identifier is a first value, the data transmission channel includes a primary 20 MHz channel;

if the bandwidth identifier is a second value, the data transmission channel includes a primary 20 MHz channel and a secondary 20 MHz channel;

if the bandwidth identifier is a third value, and the channel bonding identifier is the first value, the data transmission channel includes a primary 20 MHz channel, a secondary 20 MHz channel, and a secondary 40 MHz channel;

if the bandwidth identifier is a third value, and the channel bonding identifier is the second value, the data transmission channel includes a primary 20 MHz channel and a secondary 40 MHz channel;

if the bandwidth identifier is a fourth value, and the channel bonding identifier is the first value, the data transmission channel includes a primary 20 MHz channel, a secondary 20 MHz channel, a secondary 40 MHz channel, and a secondary 80 MHz channel; or if the bandwidth identifier is a fourth value, and the channel bonding identifier is the second value, the data transmission channel includes a primary 20 MHz channel and a secondary 80 MHz channel.

Manner 4:

If the bandwidth identifier is a first value, the data transmission channel includes a primary 20 MHz channel;

if the bandwidth identifier is a second value, the data transmission channel includes a primary 20 MHz channel and a secondary 20 MHz channel;

if the bandwidth identifier is a third value, and the channel bonding identifier is the first value, the data transmission channel includes a primary 20 MHz channel, a secondary 20 MHz channel, and a secondary 40 MHz channel;

if the bandwidth identifier is a third value, and the channel bonding identifier is the second value, the data transmission channel includes a primary 20 MHz channel and a secondary 40 MHz channel;

if the bandwidth identifier is a fourth value, and the channel bonding identifier is the first value, the data transmission channel includes a primary 20 MHz channel, a secondary 20 MHz channel, a secondary 40 MHz channel, and a secondary 80 MHz channel; or if the bandwidth identifier is a fourth value, and the channel bonding identifier is the second value, the data transmission channel includes a primary 20 MHz channel, a secondary 20 MHz channel, and a secondary 80 MHz channel.

Manner 5:

If the bandwidth identifier is a first value, the data transmission channel includes a primary 20 MHz channel;

if the bandwidth identifier is a second value, the data transmission channel includes a primary 20 MHz channel and a secondary 20 MHz channel;

if the bandwidth identifier is a third value, and the channel bonding identifier is the first value, the data transmission channel includes a primary 20 MHz channel, a secondary 20 MHz channel, and a secondary 40 MHz channel;

if the bandwidth identifier is a third value, and the channel bonding identifier is the second value, the data transmission channel includes a primary 20 MHz channel and a secondary 40 MHz channel; or if the bandwidth identifier is a fourth value, the data transmission channel includes a primary 20 MHz channel, a secondary 20 MHz channel, a secondary 40 MHz channel, and a secondary 80 MHz channel.

It should be noted that a channel mapping relationship of manners 1 to 5 is shown in FIG. 6 to FIG. 10, and detailed descriptions are already provided in Embodiment 1.

It should be noted that other channel indication manners in Embodiment 1 to Embodiment 3 are also applied to the apparatus for indicating a channel in Embodiment 4.

This embodiment of the present invention provides an apparatus for indicating a channel in a wireless local area network WLAN. A baseband circuit generates a physical protocol data unit PPDU, the PPDU includes a preamble field and a data field, a high efficiency signal field HE-SIG-A of the preamble field includes a bandwidth identifier and a secondary 20 MHz channel identifier, and when the bandwidth identifier indicates that a data transmission channel is greater than 40 MHz, the secondary 20 MHz channel identifier is used to indicate whether a secondary 20 MHz channel is available. In the foregoing manner, a discontinuous channel in a frequency domain in a wireless local area network is indicated, an available data transmission channel is improved, and a system throughput is increased.

Embodiment 5

Embodiment 5 of the present invention provides a method, which is applied to a WLAN, for indicating a channel. The method may be applied to a station, for example, the AP and the STA 1 to the STA 3 in FIG. 2. The station may support a next-generation WLAN standard, for example, the 802.11ax standard.

In this embodiment, a data transmission channel is indicated by using a bandwidth identifier in a PPDU, and the bandwidth (BW) identifier includes at least three bits.

The data transmission channel includes the following eight modes:

Mode 1: a primary 20 MHz channel.

Mode 2: a primary 20 MHz channel and a secondary 20 MHz channel.

Mode 3: a primary 20 MHz channel, a secondary 20 MHz channel, and at least one 20 MHz channel of a secondary 40 MHz channel.

Mode 4: At least a primary 20 MHz channel and a 20 MHz channel of a secondary 40 MHz channel are included, and the location of the 20 MHz channel is opposite parity comparing with a location of the primary 20 MHz channel, and, any 20 MHz channel of a secondary 80 MHz channel is not included.

The opposite parity herein means that in descending order or in ascending order of frequencies, one 20 MHz channel is on a 20 MHz channel numbered by using an odd number, and the other 20 MHz channel is on a 20 MHz channel numbered by using an even number.

Mode 5: At least a primary 20 MHz channel, a secondary 20 MHz channel, and at least one 20 MHz channel of a secondary 80 MHz channel are included.

Mode 6: At least a primary 20 MHz channel, a 20 MHz channel of a secondary 40 MHz channel and at least one 20 MHz channel of a secondary 80 MHz channel are included, and the location of the 20 MHz channel of the secondary 40 MHz channel is opposite parity comparing with a location of the primary 20 MHz channel.

Mode 7: At least a primary 20 MHz channel and a first 20 MHz channel of two 20 MHz channels are included, and the locations of the two 20 MHz channels of a secondary 80 MHz channel are opposite parity comparing with a location of the primary 20 MHz channel.

Mode 8: At least a primary 20 MHz channel and a second 20 MHz channel of two 20 MHz channels are included, and the locations of the two 20 MHz channels of a secondary 80 MHz channel are opposite parity comparing with a location of the primary 20 MHz channel.

The first 20 MHz channel and the second 20 MHz channel may be defined by using different methods, and this is not limited in this patent. For example, the first 20 MHz channel is a 20 MHz channel, which has a lower frequency, of the two 20 MHz channels, and locations of the two 20 MHz channels of the secondary 80 MHz channel are opposite parity comparing with the location of the primary 20 MHz channel, and the second 20 MHz channel is a 20 MHz channel, which has a higher frequency, of the two 20 MHz channels, and locations of the two 20 MHz channels of the secondary 80 MHz channel are opposite parity comparing with the location of the primary 20 MHz channel. Alternatively, a contrary case is also applicable. For another example, the first 20 MHz channel is a 20 MHz channel, whose rate of frequency separation to the primary 20 MHz channel is smaller, of the two 20 MHz channels of the secondary 80 MHz channel, and locations of the two 20 MHz channels are opposite parity comparing with the location of the primary 20 MHz channel, and the second 20 MHz channel is a 20 MHz channel, whose rate of frequency separation to the primary 20 MHz channel is larger, of the two 20 MHz channels of the secondary 80 MHz channel, and locations of the two 20 MHz channels are opposite parity comparing with the location of the primary 20 MHz channel. Alternatively, a contrary case is also applicable.

It should be noted that when a channel is a primary 20 MHz channel and a 20 MHz channel of secondary 40 MHz, whose location is the same parity as that of the primary 20 MHz channel, mode 3 or mode 4 may be indicated. With such a result, when receiving a part of an HE-SIG-B on the primary 20 MHz channel, a receiving station attempts to receive the other part of the HE-SIG-B on a secondary 20 MHz channel or a 20 MHz channel of secondary 40 MHz, whose location is opposite parity comparing with that of the primary 20 MHz channel, but the receiving fails. No information related to the HE-SIG-B is transmitted on a 20 MHz channel or the 20 MHz channel of secondary 40 MHz, whose location is opposite parity comparing with that of the primary 20 MHz channel. Therefore, the receiving failure does not bring any information loss.

It should be added that when the channel includes the primary 20 MHz channel and at least one 20 MHz channel of secondary 80 MHz, but does not include any 20 MHz channel whose location is opposite parity comparing with that of the primary 20 MHz channel, mode 5, 6, 7, or 8 may be indicated. With such a result, when receiving a part of an HE-SIG-B on the primary 20 MHz channel, a receiving station attempts to receive the other part of the HE-SIG-B on the 20 MHz channel whose location is opposite parity comparing with that of the primary 20 MHz channel and that is indicated in the mode, but the receiving fails. No information related to the HE-SIG-B is transmitted on the 20 MHz channel whose location is opposite parity comparing with that of the primary 20 MHz channel. Therefore, the receiving failure does not bring any information loss.

A correspondence between a bandwidth identifier and the eight modes is not limited in the present invention, and the following corresponding manner is preferably selected:

|  | Bandwidth identifier | | | | | | | |
|---|---|---|---|---|---|---|---|---|
|  | 000 | 001 | 010 | 011 | 100 | 101 | 110 | 111 |
| Mode | Mode 1 | Mode 2 | Mode 3 | Mode 4 | Mode 5 | Mode 6 | Mode 7 | Mode 8 |

A correspondence between the eight modes and the channel is shown in Table 11.

TABLE 11

| Mode | Bandwidth range of a channel | Actually used channel | |
|---|---|---|---|
| 1 | 20 MHz | 0 | |
| 2 | 40 MHz | (0, 1) | |
| 3 | 80 MHz | (0, 1, 2) (0, 1, 3) (0, 1, 2, 3) | |
| 4 | 80 MHz | (0, 3) (0, 1, 3) (0, 2, 3) (0, 1, 2, 3) | |
| 5 | 160 MHz | (0, 1, 4) | (0, 1, 2, 4) |
|  |  | (0, 1, 5) | (0, 1, 2, 5) |
|  |  | (0, 1, 6) | (0, 1, 2, 6) |
|  |  | (0, 1, 7) | (0, 1, 2, 7) |
|  |  | (0, 1, 4, 5) | (0, 1, 2, 4, 5) |
|  |  | (0, 1, 4, 6) | (0, 1, 2, 4, 6) |
|  |  | (0, 1, 4, 7) | (0, 1, 2, 4, 7) |
|  |  | (0, 1, 5, 6) | (0, 1, 2, 5, 6) |
|  |  | (0, 1, 5, 7) | (0, 1, 2, 5, 7) |
|  |  | (0, 1, 6, 7) | (0, 1, 2, 6, 7) |
|  |  | (0, 1, 4, 5, 6) | (0, 1, 2, 4, 5, 6) |
|  |  | (0, 1, 4, 5, 7) | (0, 1, 2, 4, 5, 7) |
|  |  | (0, 1, 4, 6, 7) | (0, 1, 2, 4, 6, 7) |
|  |  | (0, 1, 5, 6, 7) | (0, 1, 2, 5, 6, 7) |
|  |  | (0, 1, 4, 5, 6, 7) | (0, 1, 2, 4, 5, 6, 7) |
|  |  | (0, 1, 3, 4) | (0, 1, 2, 3, 4) |
|  |  | (0, 1, 3, 5) | (0, 1, 2, 3, 5) |
|  |  | (0, 1, 3, 6) | (0, 1, 2, 3, 6) |
|  |  | (0, 1, 3, 7) | (0, 1, 2, 3, 7) |
|  |  | (0, 1, 3, 4, 5) | (0, 1, 2, 3, 4, 5) |
|  |  | (0, 1, 3, 4, 6) | (0, 1, 2, 3, 4, 6) |
|  |  | (0, 1, 3, 4, 7) | (0, 1, 2, 3, 4, 7) |
|  |  | (0, 1, 3, 5, 6) | (0, 1, 2, 3, 5, 6) |
|  |  | (0, 1, 3, 5, 7) | (0, 1, 2, 3, 5, 7) |
|  |  | (0, 1, 3, 6, 7) | (0, 1, 2, 3, 6, 7) |
|  |  | (0, 1, 3, 4, 5, 6) | (0, 1, 2, 3, 4, 5, 6) |
|  |  | (0, 1, 3, 4, 5, 7) | (0, 1, 2, 3, 4, 5, 7) |
|  |  | (0, 1, 3, 4, 6, 7) | (0, 1, 2, 3, 4, 6, 7) |
|  |  | (0, 1, 3, 5, 6, 7) | (0, 1, 2, 3, 5, 6, 7) |
|  |  | (0, 1, 3, 4, 5, 6, 7) | (0, 1, 2, 3, 4, 5, 6, 7) |
| 6 | 160 MHz | (0, 3, 4) | (0, 1, 3, 4) |
|  |  | (0, 3, 5) | (0, 1, 3, 5) |
|  |  | (0, 3, 6) | (0, 1, 3, 6) |
|  |  | (0, 3, 7) | (0, 1, 3, 7) |
|  |  | (0, 3, 4, 5) | (0, 1, 3, 4, 5) |
|  |  | (0, 3, 4, 6) | (0, 1, 3, 4, 6) |
|  |  | (0, 3, 4, 7) | (0, 1, 3, 4, 7) |
|  |  | (0, 3, 5, 6) | (0, 1, 3, 5, 6) |

TABLE 11-continued

| Mode | Bandwidth range of a channel | Actually used channel | |
|---|---|---|---|
| | | (0, 3, 5, 7) | (0, 1, 3, 5, 7) |
| | | (0, 3, 6, 7) | (0, 1, 3, 6, 7) |
| | | (0, 3, 4, 5, 6) | (0, 1, 3, 4, 5, 6) |
| | | (0, 3, 4, 5, 7) | (0, 1, 3, 4, 5, 7) |
| | | (0, 3, 4, 6, 7) | (0, 1, 3, 4, 6, 7) |
| | | (0, 3, 5, 6, 7) | (0, 1, 3, 5, 6, 7) |
| | | (0, 3, 4, 5, 6, 7) | (0, 1, 3, 4, 5, 6, 7) |
| | | (0, 2, 3, 4) | (0, 1, 2, 3, 4) |
| | | (0, 2, 3, 5) | (0, 1, 2, 3, 5) |
| | | (0, 2, 3, 6) | (0, 1, 2, 3, 6) |
| | | (0, 2, 3, 7) | (0, 1, 2, 3, 7) |
| | | (0, 2, 3, 4, 5) | (0, 1, 2, 3, 4, 5) |
| | | (0, 2, 3, 4, 6) | (0, 1, 2, 3, 4, 6) |
| | | (0, 2, 3, 4, 7) | (0, 1, 2, 3, 4, 7) |
| | | (0, 2, 3, 5, 6) | (0, 1, 2, 3, 5, 6) |
| | | (0, 2, 3, 5, 7) | (0, 1, 2, 3, 5, 7) |
| | | (0, 2, 3, 6, 7) | (0, 1, 2, 3, 6, 7) |
| | | (0, 2, 3, 4, 5, 6) | (0, 1, 2, 3, 4, 5, 6) |
| | | (0, 2, 3, 4, 5, 7) | (0, 1, 2, 3, 4, 5, 7) |
| | | (0, 2, 3, 4, 6, 7) | (0, 1, 2, 3, 4, 6, 7) |
| | | (0, 2, 3, 5, 6, 7) | (0, 1, 2, 3, 5, 6, 7) |
| | | (0, 2, 3, 4, 5, 6, 7) | (0, 1, 2, 3, 4, 5, 6, 7) |
| 7 | 160 MHz | (0, 5) | (0, 5, 7) |
| | | (0, 5, 1) | (0, 5, 7, 1) |
| | | (0, 5, 2) | (0, 5, 7, 2) |
| | | (0, 5, 3) | (0, 5, 7, 3) |
| | | (0, 5, 4) | (0, 5, 7, 4) |
| | | (0, 5, 6) | (0, 5, 7, 6) |
| | | (0, 5, 1, 2) | (0, 5, 7, 1, 2) |
| | | (0, 5, 1, 3) | (0, 5, 7, 1, 3) |
| | | (0, 5, 1, 4) | (0, 5, 7, 1, 4) |
| | | (0, 5, 1, 6) | (0, 5, 7, 1, 6) |
| | | (0, 5, 2, 3) | (0, 5, 7, 2, 3) |
| | | (0, 5, 2, 4) | (0, 5, 7, 2, 4) |
| | | (0, 5, 2, 6) | (0, 5, 7, 2, 6) |
| | | (0, 5, 3, 4) | (0, 5, 7, 3, 4) |
| | | (0, 5, 3, 6) | (0, 5, 7, 3, 6) |
| | | (0, 5, 4, 6) | (0, 5, 7, 4, 6) |
| | | (0, 5, 3, 4, 6) | (0, 5, 7, 3, 4, 6) |
| | | (0, 5, 2, 4, 6) | (0, 5, 7, 2, 4, 6) |
| | | (0, 5, 2, 3, 6) | (0, 5, 7, 2, 3, 6) |
| | | (0, 5, 2, 3, 4) | (0, 5, 7, 2, 3, 4) |
| | | (0, 5, 1, 4, 6) | (0, 5, 7, 1, 4, 6) |
| | | (0, 5, 1, 3, 6) | (0, 5, 7, 1, 3, 6) |
| | | (0, 5, 1, 3, 4) | (0, 5, 7, 1, 3, 4) |
| | | (0, 5, 1, 2, 6) | (0, 5, 7, 1, 2, 6) |
| | | (0, 5, 1, 2, 4) | (0, 5, 7, 1, 2, 4) |
| | | (0, 5, 1, 2, 3) | (0, 5, 7, 1, 2, 3) |
| | | (0, 5, 1, 2, 3, 4) | (0, 5, 7, 1, 2, 3, 4) |
| | | (0, 5, 1, 2, 3, 6) | (0, 5, 7, 1, 2, 3, 6) |
| | | (0, 5, 1, 2, 4, 6) | (0, 5, 7, 1, 2, 4, 6) |
| | | (0, 5, 1, 3, 4, 6) | (0, 5, 7, 1, 3, 4, 6) |
| | | (0, 5, 2, 3, 4, 6) | (0, 5, 7, 2, 3, 4, 6) |
| | | (0, 5, 1, 2, 3, 4, 6) | (0, 5, 7, 1, 2, 3, 4, 6) |
| 8 | 160 MHz | (0, 7) | (0, 5, 7) |
| | | (0, 7, 1) | (0, 5, 7, 1) |
| | | (0, 7, 2) | (0, 5, 7, 2) |
| | | (0, 7, 3) | (0, 5, 7, 3) |
| | | (0, 7, 4) | (0, 5, 7, 4) |
| | | (0, 7, 6) | (0, 5, 7, 6) |
| | | (0, 7, 1, 2) | (0, 5, 7, 1, 2) |
| | | (0, 7, 1, 3) | (0, 5, 7, 1, 3) |
| | | (0, 7, 1, 4) | (0, 5, 7, 1, 4) |
| | | (0, 7, 1, 6) | (0, 5, 7, 1, 6) |
| | | (0, 7, 2, 3) | (0, 5, 7, 2, 3) |
| | | (0, 7, 2, 4) | (0, 5, 7, 2, 4) |
| | | (0, 7, 2, 6) | (0, 5, 7, 2, 6) |
| | | (0, 7, 3, 4) | (0, 5, 7, 3, 4) |
| | | (0, 7, 3, 6) | (0, 5, 7, 3, 6) |
| | | (0, 7, 4, 6) | (0, 5, 7, 4, 6) |
| | | (0, 7, 3, 4, 6) | (0, 5, 7, 3, 4, 6) |
| | | (0, 7, 2, 4, 6) | (0, 5, 7, 2, 4, 6) |
| | | (0, 7, 2, 3, 6) | (0, 5, 7, 2, 3, 6) |
| | | (0, 7, 2, 3, 4) | (0, 5, 7, 2, 3, 4) |
| | | (0, 7, 1, 4, 6) | (0, 5, 7, 1, 4, 6) |
| | | (0, 7, 1, 3, 6) | (0, 5, 7, 1, 3, 6) |
| | | (0, 7, 1, 3, 4) | (0, 5, 7, 1, 3, 4) |
| | | (0, 7, 1, 2, 6) | (0, 5, 7, 1, 2, 6) |
| | | (0, 7, 1, 2, 4) | (0, 5, 7, 1, 2, 4) |
| | | (0, 7, 1, 2, 3) | (0, 5, 7, 1, 2, 3) |
| | | (0, 7, 1, 2, 3, 4) | (0, 5, 7, 1, 2, 3, 4) |
| | | (0, 7, 1, 2, 3, 6) | (0, 5, 7, 1, 2, 3, 6) |
| | | (0, 7, 1, 2, 4, 6) | (0, 5, 7, 1, 2, 4, 6) |
| | | (0, 7, 1, 3, 4, 6) | (0, 5, 7, 1, 3, 4, 6) |
| | | (0, 7, 2, 3, 4, 6) | (0, 5, 7, 2, 3, 4, 6) |
| | | (0, 7, 1, 2, 3, 4, 6) | (0, 5, 7, 1, 2, 3, 4, 6) |

Notes:
(0, 2) belongs to mode 3 or mode 4.

Notes:
(0, 4), (0, 6), (0, 4, 6), (0, 2, 4), (0, 2, 6), and (0, 2, 4, 6) belong to mode 5, or mode 6, or mode 7, or mode 8.

The channel identifier used in the table is a logical identifier of the channel. Generally, a channel identifier 0 indicates a primary 20 MHz channel, a channel identifier 1 indicates a secondary 20 MHz channel, channel identifiers 2 and 3 indicate a secondary 40 MHz channel, and channel identifiers 4 to 7 indicate a secondary 80 MHz channel. A frequently used mapping relationship between a channel identifier and a channel is described above. Another mapping relationship between a channel identifier and a channel also exists. This is not limited in the present invention.

For convenience of description below, an HE-SIG-B on a primary channel is referred to as an HE-SIG-B 1 herein. As shown in FIG. 6, FIG. 7, FIG. 8, and FIG. 9, the HE-SIG-B 1 is copied on a channel whose location is the same parity as that of the primary channel, and a common part of the HE-SIG-B 1 includes RU allocation signaling of a primary 20 MHz channel and a 20 MHz channel whose location is the same parity as that of the primary channel. A common part of an HE-SIG-B 2 includes RU allocation signaling of a 20 MHz channel whose location is opposite parity comparing with that of the primary 20 MHz channel, and is copied on the multiple 20 MHz channels. It is assumed that RU allocation signaling of each 20 MHz channel has a length of N bits, and eight bits is used as an example in the following descriptions.

Each of the foregoing eight modes carries two pieces of information. The first piece of information indicates a length of the common part of the HE-SIG-B 1 and a length of the common part of the HE-SIG-B 2 to a receiving node (herein, the length of the common part of the HE-SIG-B 1 is equal to the length of the common part of the HE-SIG-B 2). The second piece of information indicates on which 20 MHz channel the receiving node receives the HE-SIG-B 2. It should be noted herein that the receiving node is bound to receive the HE-SIG-B 1 on the primary 20 MHz channel. For example, mode 3 indicates to the receiving node that both the length of the common part of the HE-SIG-B 1 and the length of the common part of the HE-SIG-B 2 are 16 bits (statistics on a length of RU allocation signaling of only a 20 MHz channel is collected herein), and the HE-SIG-B 2 is received on a channel whose logical identifier is 1. For another example, mode 8 indicates to the receiving node that both the length of the common part of the HE-SIG-B 1 and the length of the common part of the HE-SIG-B 2 are 32 bits, and the HE-SIG-B 2 is received on a 20 M channel whose logical identifier is 7. Therefore, the foregoing eight modes indicate that the receiving node can correctly receive the HE-SIG-B 1 and the HE-SIG-B 2.

In addition, special RU allocation signaling, that is, 242 (0), exists in the RU allocation signaling of an HE-SIG-B 20 MHz channel, and indicates that 242 subcarriers that can transmit information and that correspond to the 20 MHz channel do not transmit data of any station. That is, the 20 MHz channel does not perform data transmission.

With reference to the eight modes of the HE-SIG-A and the RU allocation signaling, which is included in the common parts of the HE-SIG-B 1 and the HE-SIG-B 2, of each 20 MHz, the receiving node can learn that data is received on which channels. For example, it is assumed that a data transmission channel is (0 1 2), and a sending node sets a bandwidth identifier bit of an HE-SIG-A in a physical layer preamble to mode 3. In addition, the HE-SIG-B 1 includes RU allocation signaling of a channel 0 and a channel 2, and the HE-SIG-B 2 includes RU allocation signaling of a channel 1 and a channel 3. The RU allocation signaling of the channel 3 is 242(0). After receiving the HE-SIG-A, a receiver learns, according to the bandwidth identifier bit, that mode 3 is used. That is, both the length of the common part of the HE-SIG-B 1 and the length of the common part of the HE-SIG-B 2 are 16 bits. The HE-SIG-B 1 is received on a channel whose logical identifier is 0 (the primary 20 MHz channel), and the HE-SIG-B 2 is received on a channel whose logical identifier is 1. With reference to the RU allocation signaling 242(0), which is included in the HE-SIG-B 2, of the channel whose logical identifier is 3, it is learned that the data transmission channel is (0 1 2).

It should be noted that actually used channels indicated in each mode in Table 11 are overlapped. However, this does not affect that the receiving node learns a length of a common part of an HE-SIG-B and learns that the HE-SIG-B 2 is received on which 20 MHz channel. Therefore, the foregoing mode indication may correctly tell the receiving node that data transmission is performed on which 20 MHz channels. In a implementation, the actually used channels that are overlapped are used in only one mode, so that actually used channels indicated in all the modes are not overlapped. For example, cases in which actually used channels that are overlapped and that are indicated in mode 3 and mode 4 in Table 11 are (0, 1, 3), (0, 1, 2, 3), and (0, 2). To avoid overlapping, the foregoing three cases of actually used channels are used only in mode 3, and are removed from mode 4. It should be noted that the foregoing channel overlapping cases are also applicable to another embodiment.

It should be noted that different orders of channel identifiers in Table 11 do not affect actually used channels. For example, actually used channels indicated by channel identifiers (0, 7, 1, 2) and channel identifiers (0, 1, 2, 7) are the same.

This embodiment of the present invention provides a method for indicating a channel in a wireless local area network WLAN. A sending station generates and sends a physical protocol data unit PPDU, the PPDU includes a preamble field and a data field, a high efficiency signal field HE-SIG-A of the preamble field includes a bandwidth identifier, and the bandwidth identifier is used to indicate a data transmission channel. In the foregoing manner, a discontinuous channel in a frequency domain in a wireless local area network is indicated, an available data transmission channel is improved, and a system throughput is increased.

Embodiment 6

Embodiment 6 of the present invention provides a method, which is applied to a WLAN, for indicating a channel. The method may be applied to a station, for example, the AP and the STA 1 to the STA 3 in FIG. 2. The station may support a next-generation WLAN standard, for example, the 802.11ax standard.

In this embodiment, a data transmission channel is indicated by using a bandwidth identifier in a PPDU, and the bandwidth (BW) identifier includes at least three bits.

The data transmission channel includes the following eight modes:

Mode 1: a primary 20 MHz channel.

Mode 2: a primary 20 MHz channel and a secondary 20 MHz channel.

Mode 3: a primary 20 MHz channel, a secondary 20 MHz channel, and at least one 20 MHz channel of a secondary 40 MHz channel.

Mode 4: At least a primary 20 MHz channel and a 20 MHz channel of a secondary 40 MHz channel are included, and location of the 20 MHz channel is opposite parity comparing with a location of the primary 20 MHz channel, and, any 20 MHz channel of a secondary 80 MHz channel is not included.

Mode 5: a primary 20 MHz channel and a 20 MHz channel of a secondary 40 MHz channel are included, and location of the 20 MHz channel is the same parity as that of the primary 20 MHz channel.

Mode 6: At least a primary 20 MHz channel, a secondary 20 MHz channel, and at least one 20 MHz channel of a secondary 80 MHz channel are included.

Mode 7: At least a primary 20 MHz channel, a 20 MHz channel of a secondary 40 MHz channel, and at least one 20 MHz channel of a secondary 80 MHz channel are included, and a location of the 20 MHz channel of a secondary 40 MHz channel is opposite parity comparing with a location of the primary 20 MHz channel.

Mode 8: a primary 20 MHz channel, a 20 MHz channel of a secondary 40 MHz channel and at least one 20 MHz channel of a secondary 80 MHz channel are included, and a location of the 20 MHz channel of a secondary 40 MHz channel is the same parity as a location of the primary 20 MHz channel.

A correspondence between the bandwidth identifier and the eight modes is not limited in the present invention, and the following corresponding manner is introduced for use:

|  | Bandwidth identifier | | | | | | | |
| --- | --- | --- | --- | --- | --- | --- | --- | --- |
|  | 000 | 001 | 010 | 011 | 100 | 101 | 110 | 111 |
| Mode | Mode 1 | Mode 2 | Mode 3 | Mode 4 | Mode 5 | Mode 6 | Mode 7 | Mode 8 |

A correspondence between the eight modes and the channel is shown in Table 12.

TABLE 12

| Mode | Bandwidth range of a channel | Actually used channel | |
|---|---|---|---|
| 1 | 20 MHz | (0) | |
| 2 | 40 MHz | (0,1) | |
| 3 | 80 MHz | (0, 1, 2) (0, 1, 3) (0, 1, 2, 3) | |
| 4 | 80 MHz | (0, 3) (0, 1, 3) (0, 2, 3) (0, 1, 2, 3) | |
| 5 | 80 MHz | (0, 2) | |
| 6 | 160 MHz | (0, 1, 4) | (0, 1, 2, 4) |
| | | (0, 1, 5) | (0, 1, 2, 5) |
| | | (0, 1, 6) | (0, 1, 2, 6) |
| | | (0, 1, 7) | (0, 1, 2, 7) |
| | | (0, 1, 4, 5) | (0, 1, 2, 4, 5) |
| | | (0, 1, 4, 6) | (0, 1, 2, 4, 6) |
| | | (0, 1, 4, 7) | (0, 1, 2, 4, 7) |
| | | (0, 1, 5, 6) | (0, 1, 2, 5, 6) |
| | | (0, 1, 5, 7) | (0, 1, 2, 5, 7) |
| | | (0, 1, 6, 7) | (0, 1, 2, 6, 7) |
| | | (0, 1, 4, 5, 6) | (0, 1, 2, 4, 5, 6) |
| | | (0, 1, 4, 5, 7) | (0, 1, 2, 4, 5, 7) |
| | | (0, 1, 4, 6, 7) | (0, 1, 2, 4, 6, 7) |
| | | (0, 1, 5, 6, 7) | (0, 1, 2, 5, 6, 7) |
| | | (0, 1, 4, 5, 6, 7) | (0, 1, 2, 4, 5, 6, 7) |
| | | (0, 1, 3, 4) | (0, 1, 2, 3, 4) |
| | | (0, 1, 3, 5) | (0, 1, 2, 3, 5) |
| | | (0, 1, 3, 6) | (0, 1, 2, 3, 6) |
| | | (0, 1, 3, 7) | (0, 1, 2, 3, 7) |
| | | (0, 1, 3, 4, 5) | (0, 1, 2, 3, 4, 5) |
| | | (0, 1, 3, 4, 6) | (0, 1, 2, 3, 4, 6) |
| | | (0, 1, 3, 4, 7) | (0, 1, 2, 3, 4, 7) |
| | | (0, 1, 3, 5, 6) | (0, 1, 2, 3, 5, 6) |
| | | (0, 1, 3, 5, 7) | (0, 1, 2, 3, 5, 7) |
| | | (0, 1, 3, 6, 7) | (0, 1, 2, 3, 6, 7) |
| | | (0, 1, 3, 4, 5, 6) | (0, 1, 2, 3, 4, 5, 6) |
| | | (0, 1, 3, 4, 5, 7) | (0, 1, 2, 3, 4, 5, 7) |
| | | (0, 1, 3, 4, 6, 7) | (0, 1, 2, 3, 4, 6, 7) |
| | | (0, 1, 3, 5, 6, 7) | (0, 1, 2, 3, 5, 6, 7) |
| | | (0, 1, 3, 4, 5, 6, 7) | (0, 1, 2, 3, 4, 5, 6, 7) |
| 7 | 160 MHz | (0, 3, 4) | (0, 1, 3, 4) |
| | | (0, 3, 5) | (0, 1, 3, 5) |
| | | (0, 3, 6) | (0, 1, 3, 6) |
| | | (0, 3, 7) | (0, 1, 3, 7) |
| | | (0, 3, 4, 5) | (0, 1, 3, 4, 5) |
| | | (0, 3, 4, 6) | (0, 1, 3, 4, 6) |
| | | (0, 3, 4, 7) | (0, 1, 3, 4, 7) |
| | | (0, 3, 5, 6) | (0, 1, 3, 5, 6) |
| | | (0, 3, 5, 7) | (0, 1, 3, 5, 7) |
| | | (0, 3, 6, 7) | (0, 1, 3, 6, 7) |
| | | (0, 3, 4, 5, 6) | (0, 1, 3, 4, 5, 6) |
| | | (0, 3, 4, 5, 7) | (0, 1, 3, 4, 5, 7) |
| | | (0, 3, 4, 6, 7) | (0, 1, 3, 4, 6, 7) |
| | | (0, 3, 5, 6, 7) | (0, 1, 3, 5, 6, 7) |
| | | (0, 3, 4, 5, 6, 7) | (0, 1, 3, 4, 5, 6, 7) |
| | | (0, 2, 3, 4) | (0, 1, 2, 3, 4) |
| | | (0, 2, 3, 5) | (0, 1, 2, 3, 5) |
| | | (0, 2, 3, 6) | (0, 1, 2, 3, 6) |
| | | (0, 2, 3, 7) | (0, 1, 2, 3, 7) |
| | | (0, 2, 3, 4, 5) | (0, 1, 2, 3, 4, 5) |
| | | (0, 2, 3, 4, 6) | (0, 1, 2, 3, 4, 6) |
| | | (0, 2, 3, 4, 7) | (0, 1, 2, 3, 4, 7) |
| | | (0, 2, 3, 5, 6) | (0, 1, 2, 3, 5, 6) |
| | | (0, 2, 3, 5, 7) | (0, 1, 2, 3, 5, 7) |
| | | (0, 2, 3, 6, 7) | (0, 1, 2, 3, 6, 7) |
| | | (0, 2, 3, 4, 5, 6) | (0, 1, 2, 3, 4, 5, 6) |
| | | (0, 2, 3, 4, 5, 7) | (0, 1, 2, 3, 4, 5, 7) |
| | | (0, 2, 3, 4, 6, 7) | (0, 1, 2, 3, 4, 6, 7) |
| | | (0, 2, 3, 5, 6, 7) | (0, 1, 2, 3, 5, 6, 7) |
| | | (0, 2, 3, 4, 5, 6, 7) | (0, 1, 2, 3, 4, 5, 6, 7) |
| 8 | 160 MHz | (0, 2, 4) | |
| | | (0, 2, 5) | |
| | | (0, 2, 6) | |
| | | (0, 2, 7) | |
| | | (0, 2, 4, 5) | |
| | | (0, 2, 4, 6) | |
| | | (0, 2, 4, 7) | |
| | | (0, 2, 5, 6) | |
| | | (0, 2, 5, 7) | |
| | | (0, 2, 6, 7) | |
| | | (0, 2, 4, 5, 6) | |
| | | (0, 2, 4, 5, 7) | |
| | | (0, 2, 4, 6, 7) | |
| | | (0, 2, 5, 6, 7) | |
| | | (0, 2, 4, 5, 6, 7) | |

The channel identifier used in the table is a logical identifier of the channel. Generally, a channel identifier 0 indicates a primary 20 MHz channel, a channel identifier 1 indicates a secondary 20 MHz channel, channel identifiers 2 and 3 indicate a secondary 40 MHz channel, and channel identifiers 4 to 7 indicate a secondary 80 MHz channel. A frequently used mapping relationship between a channel identifier and a channel is described above. Another mapping relationship between a channel identifier and a channel also exists. This is not limited in the present invention.

It should be noted that different orders of channel identifiers in Table 12 do not affect actually used channels. For example, actually used channels indicated by channel identifiers (0, 7, 1, 2) and channel identifiers (0, 1, 2, 7) are the same.

Only one HE-SIG-B exists in mode 5 and mode 8. In this case, the HE-SIG-B includes RU allocation signaling of all 20 M channels. Only one piece of information, that is, a length of the HE-SIG-B, is carried in mode 5 and mode 8. In the other modes other than mode 5 and mode 8, RU allocation signaling included in common parts of the HE-SIG-B 1 and the HE-SIG-B 2 are the same as those in the transmission manner in Embodiment 5. Descriptions of overlapping cases indicated in the modes in the table are the same as those in Embodiment 5, and details are not described herein again.

This embodiment of the present invention provides a method for indicating a channel in a wireless local area network WLAN. A sending station generates and sends a physical protocol data unit PPDU, the PPDU includes a preamble field and a data field, a high efficiency signal field HE-SIG-A of the preamble field includes a bandwidth identifier, and the bandwidth identifier is used to indicate a data transmission channel. In the foregoing manner, a discontinuous channel in a frequency domain in a wireless local area network is indicated, an available data transmission channel is improved, and a system throughput is increased.

Embodiment 7

Embodiment 7 of the present invention provides a method, which is applied to a WLAN, for indicating a channel. The method may be applied to a station, for example, the AP and the STA 1 to the STA 3 in FIG. 2. The station may support a next-generation WLAN standard, for example, the 802.11ax standard.

In this embodiment, a data transmission channel is indicated by using a bandwidth identifier in a high efficiency signal field HE-SIG-A of a preamble field in a PPDU, and the bandwidth (BW) identifier includes at least three bits.

The data transmission channel includes the following eight modes:

Mode 1: a primary 20 MHz channel.

Mode 2: a primary 20 MHz channel and a secondary 20 MHz channel.

Mode 3: a primary 20 MHz channel, a secondary 20 MHz channel, and a secondary 40 MHz channel.

Mode 4: a primary 20 MHz channel, a secondary 20 MHz channel, a secondary 40 MHz channel, and a secondary 80 MHz channel.

Mode 5: a primary 20 MHz channel and a 20 MHz channel of a secondary 40 MHz channel, and the location of the 20 MHz channel is opposite parity comparing with that of the primary 20 MHz channel.

Mode 6: a primary 20 MHz channel and a secondary 40 MHz channel.

Mode 7: a primary 20 MHz channel, a secondary 20 MHz channel, and a secondary 80 MHz channel.

Mode 8: a primary 20 MHz channel, a secondary 40 MHz channel, and a secondary 80 MHz channel.

A correspondence between the bandwidth identifier and the eight modes is not limited in the present invention, and the following corresponding manner is introduced for use:

| | Bandwidth identifier | | | | | | | |
|---|---|---|---|---|---|---|---|---|
| | 000 | 001 | 010 | 011 | 100 | 101 | 110 | 111 |
| Mode | Mode 1 | Mode 2 | Mode 3 | Mode 4 | Mode 5 | Mode 6 | Mode 7 | Mode 8 |

For example, a correspondence between the eight modes and the channel is shown in FIG. 25.

This embodiment of the present invention provides a method for indicating a channel in a wireless local area network WLAN. A sending station generates and sends a physical protocol data unit PPDU, the PPDU includes a preamble field and a data field, a high efficiency signal field HE-SIG-A of the preamble field includes a bandwidth identifier, and the bandwidth identifier is used to indicate a data transmission channel. In the foregoing manner, a discontinuous channel in a frequency domain in a wireless local area network is indicated, an available data transmission channel is improved, and a system throughput is increased.

Embodiment 8

Embodiment 8 of the present invention provides a method, which is applied to a WLAN, for indicating a channel. The method may be applied to a station, for example, the AP and the STA 1 to the STA 3 in FIG. 2. The station may support a next-generation WLAN standard, for example, the 802.11ax standard.

In this embodiment, a data transmission channel is indicated by using a bandwidth identifier in a high efficiency signal field HE-SIG-A of a preamble field in a PPDU, and the bandwidth (BW) identifier includes at least three bits.

The data transmission channel includes the following eight modes:

Mode 1: a primary 20 MHz channel.

Mode 2: a primary 20 MHz channel and a secondary 20 MHz channel.

Mode 3: a primary 20 MHz channel, a secondary 20 MHz channel, and a secondary 40 MHz channel.

Mode 4: a primary 20 MHz channel, a secondary 20 MHz channel, a secondary 40 MHz channel, and a secondary 80 MHz channel.

Mode 5: a primary 20 MHz channel and a secondary 40 MHz channel.

Mode 6: a primary 20 MHz channel, a secondary 20 MHz channel, and one 20 MHz channel of a secondary 40 MHz channel.

It should be noted that mode 6 includes two implementations. The first implementation in mode 6 is a primary 20 MHz channel, a secondary 20 MHz channel, and a channel, whose location is the same parity as that of the primary 20 MHz channel, of a secondary 40 MHz channel. The second implementation in mode 6 is a primary 20 MHz channel, a secondary 20 MHz channel, and a channel, whose location is opposite parity comparing with that of the primary 20 MHz channel, of a secondary 40 MHz channel.

Mode 7: a primary 20 MHz channel, a secondary 20 MHz channel, and a secondary 80 MHz channel.

Mode 8: a primary 20 MHz channel, a secondary 40 MHz channel, and a secondary 80 MHz channel.

A correspondence between the bandwidth identifier and the eight modes is not limited in the present invention, and the following corresponding manner is introduced for use:

| | Bandwidth identifier | | | | | | | |
|---|---|---|---|---|---|---|---|---|
| | 000 | 001 | 010 | 011 | 100 | 101 | 110 | 111 |
| Mode | Mode 1 | Mode 2 | Mode 3 | Mode 4 | Mode 5 | Mode 6 | Mode 7 | Mode 8 |

For example, a correspondence between the eight modes and the channel is shown in FIG. 26 or FIG. 27.

This embodiment of the present invention provides a method for indicating a channel in a wireless local area network WLAN. A sending station generates and sends a physical protocol data unit PPDU, the PPDU includes a preamble field and a data field, a high efficiency signal field HE-SIG-A of the preamble field includes a bandwidth identifier, and the bandwidth identifier is used to indicate a data transmission channel. In the foregoing manner, a discontinuous channel in a frequency domain in a wireless local area network is indicated, an available data transmission channel is improved, and a system throughput is increased.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An apparatus for indicating a channel in a wireless local area network (WLAN), comprising:
   a baseband circuit, configured to generate a physical protocol data unit (PPDU), wherein the PPDU includes a preamble field and a data field, a high efficiency signal field, (HE-SIG-A) of the preamble field includes a bandwidth identifier, and the bandwidth identifier indicates a data transmission channel of the PPDU; and
   a radio frequency circuit, configured to send the PPDU;
   wherein, the bandwidth identifier includes three bits;
   when the bandwidth identifier is a first value, the first value indicates a first mode of the data transmission channel in a channel with a bandwidth equal to 80 MHz; in the first mode, a primary 20 MHz channel and a secondary 40 MHz channel are included in the data transmission channel and the 40 MHz channel is opposite parity compared with a location of the primary 20 MHz channel; and
   when the bandwidth identifier is a second value, the second value indicates a second mode of the data transmission channel in a channel with a bandwidth equal to 80 MHz; in the second mode, the primary 20 MHz channel, a secondary 20 MHz channel, and one 20 MHz channel of the secondary 40 MHz channel are included in the data transmission channel.

2. The apparatus according to claim 1, wherein the first value is 100.

3. The apparatus according to claim 1, wherein the second value is 101.

4. The apparatus according to claim 1, wherein the data transmission channel is discontinuous in the frequency domain.

5. The apparatus according to claim 4, wherein the data transmission channel is discontinuous in the frequency domain.

6. An apparatus for indicating a channel in a wireless local area network (WLAN), comprising:
   a baseband circuit, configured to generate a physical protocol data unit (PPDU), wherein the PPDU includes a preamble field and a data field, a high efficiency signal field (HE-SIG-A) of the preamble field includes a bandwidth identifier, and the bandwidth identifier indicates a data transmission channel of the PPDU; and
   a radio frequency circuit, configured to send the PPDU;
   wherein, the bandwidth identifier includes three bits;
   when the bandwidth identifier is a third value, the third value indicates a third mode of the data transmission channel in a channel with a bandwidth equal to 160 MHz; in the third mode, a primary 20 MHz channel, and a secondary 40 MHz channel, and at least one 20 MHz channel of a secondary 80 MHz channel are included in the data transmission channel and the 40 MHz channel is opposite parity compared with a location of the primary 20 MHz channel; and
   when the bandwidth identifier is a fourth value, the fourth value indicates a fourth mode of the data transmission channel in a channel with a bandwidth equal to 160 MHz; in the fourth mode, the primary 20 MHz channel, a secondary 20 MHz channel, and at least one 20 MHz channel of the secondary 80 MHz channel are included in the data transmission channel.

7. An apparatus in a wireless local area network (WLAN), configured to:
   receive a physical protocol data unit (PPDU), wherein the PPDU includes a preamble field and a data field, a high efficiency signal field, (ME-SIG-A), of the preamble field includes a bandwidth identifier, and the bandwidth identifier indicates a data transmission channel of the PPDU; and
   determine the data transmission channel of the PPDU in accordance with the bandwidth identifier;
   wherein, the bandwidth identifier includes three bits; and
   when the bandwidth identifier is a first value, the first value indicates a first mode of the data transmission channel in a channel with a bandwidth equal to 80 MHz; in the first mode, a primary 20 MHz channel and a secondary 40 MHz channel are included in the data transmission channel and the 40 MHz channel is opposite parity compared with a location of the primary 20 MHz channel; and
   when the bandwidth identifier is a second value, the second value indicates a second mode of the data transmission channel in a channel with a bandwidth equal to 80 MHz; in the second mode, the primary 20 MHz channel, a secondary 20 MHz channel, and one 20 MHz channel of the secondary 40 MHz channel are included in the data transmission channel.

8. The apparatus according to claim 7, wherein the first value is 100.

9. The apparatus according to claim 7, wherein the second value is 101.

10. The apparatus according to claim 7, wherein the data transmission channel is discontinuous in the frequency domain.

* * * * *

UNITED STATES PATENT AND TRADEMARK OFFICE
CERTIFICATE OF CORRECTION

PATENT NO. : 11,177,924 B2  
APPLICATION NO. : 16/897002  
DATED : November 16, 2021  
INVENTOR(S) : Li et al.

Page 1 of 1

It is certified that error appears in the above-identified patent and that said Letters Patent is hereby corrected as shown below:

In the Claims

Claim 7: Column 46, Line 21: "efficiency signal field, (ME-SIG-A), of the preamble" should read -- efficiency signal field, (HE-SIG-A), of the preamble --.

Signed and Sealed this
Twenty-eighth Day of June, 2022

Katherine Kelly Vidal
*Director of the United States Patent and Trademark Office*